（12) United States Patent
Wong et al.

(10) Patent No.: US 8,656,942 B2
(45) Date of Patent: Feb. 25, 2014

(54) LENGTH-ADJUSTABLE PRESSURE-RETAINING PIPING COMPONENTS

(75) Inventors: Henry Wong, Houston, TX (US); Pablo Garce, Chicago, IL (US); Sandra Lipezker, Highland Park, IL (US); Yue Gong, Ghangshu (CN)

(73) Assignee: FMC Technologies, Inc., Houston, TX (US)

( * ) Notice: Subject to any disclaimer, the term of this patent is extended or adjusted under 35 U.S.C. 154(b) by 385 days.

(21) Appl. No.: 13/038,724

(22) Filed: Mar. 2, 2011

(65) Prior Publication Data

US 2012/0222750 A1 Sep. 6, 2012

(51) Int. Cl.
*F16K 51/00* (2006.01)
*F16K 5/06* (2006.01)
*F16J 15/00* (2006.01)
*F16L 39/04* (2006.01)

(52) U.S. Cl.
USPC .............. 137/315.17; 137/315.21; 251/148; 251/151; 277/578; 277/580

(58) Field of Classification Search
USPC ......... 277/339, 505, 578, 580, 581, 585, 616; 251/148, 150, 151; 137/315.17, 137/315.21, 315.31, 317, 318
See application file for complete search history.

(56) References Cited

U.S. PATENT DOCUMENTS

| 3,226,082 A | 12/1965 | Gulick |
| 4,840,521 A | 6/1989 | Bonnet |
| 5,509,668 A * | 4/1996 | Kurita et al. ................... 277/390 |
| 6,155,295 A * | 12/2000 | Nimberger ..................... 137/614 |
| 7,628,169 B2 * | 12/2009 | Choate et al. ................. 137/469 |

FOREIGN PATENT DOCUMENTS

| EP | 2 147 853 A2 | 1/2010 |
| WO | 2009/121512 A1 | 10/2009 |

OTHER PUBLICATIONS

PCT Search Report and Written Opinion from PCT/US2011/026810 dated Dec. 1, 2011.

* cited by examiner

*Primary Examiner* — John K Fristoe, Jr.
*Assistant Examiner* — Kevin Barss
(74) *Attorney, Agent, or Firm* — Amerson Law Firm, PLLC

(57) ABSTRACT

Generally, the subject matter disclosed herein relates to length-adjustable pressure-retaining components used in piping systems. In one illustrative embodiment, a device comprising a first pressure component and an adjustable spacer ring operatively coupled to the first pressure component is disclosed, wherein the adjustable spacer ring is adapted to adjust a combined overall length of said the pressure component and the adjustable spacer ring.

54 Claims, 10 Drawing Sheets

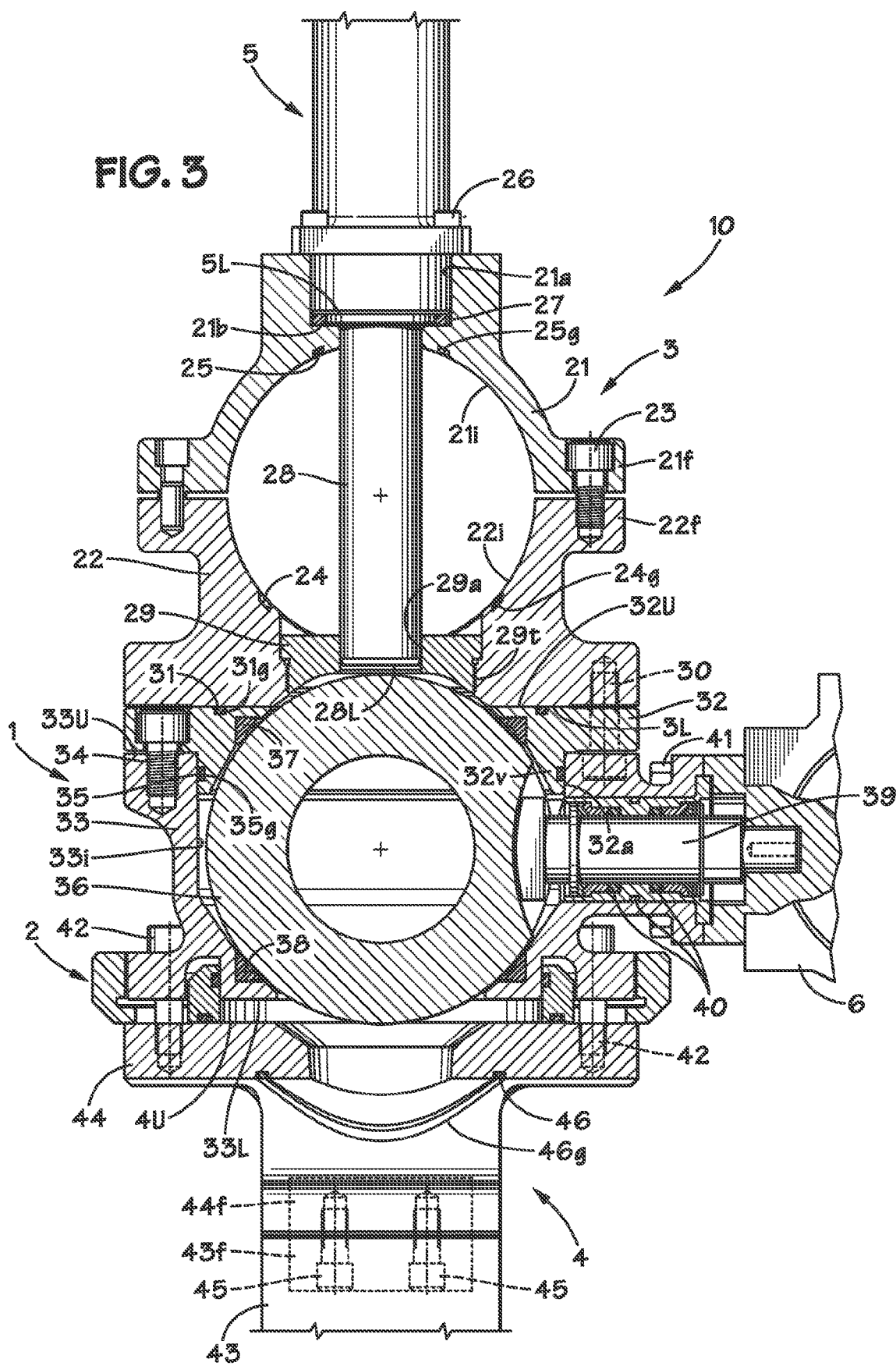

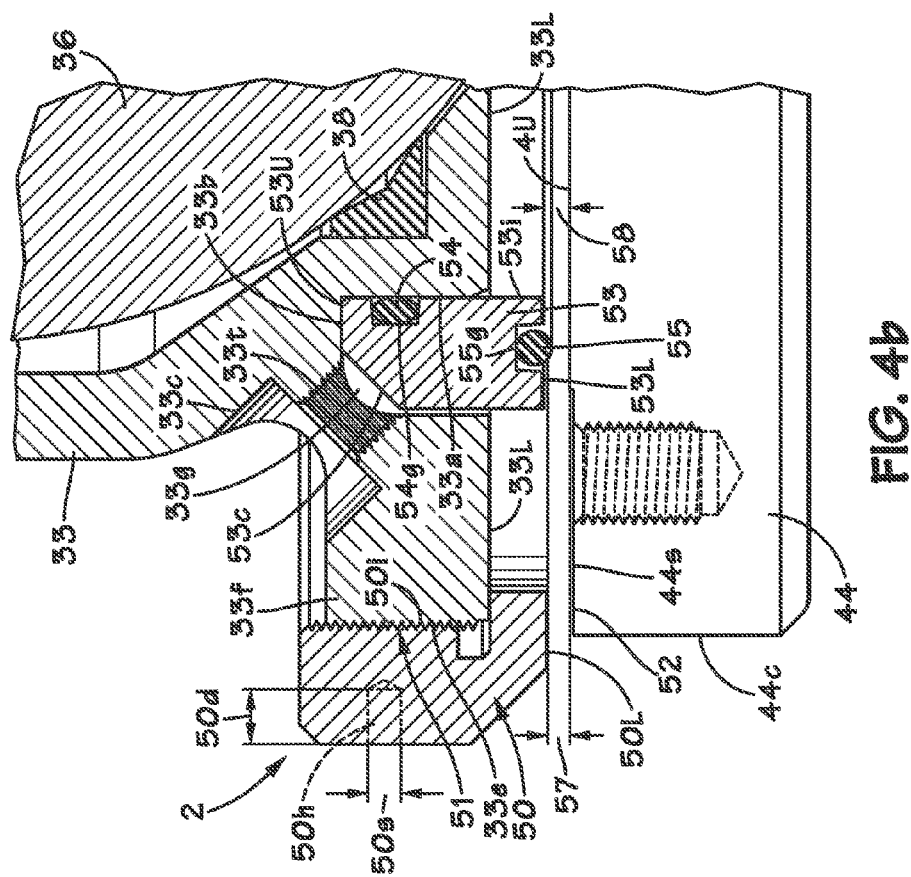
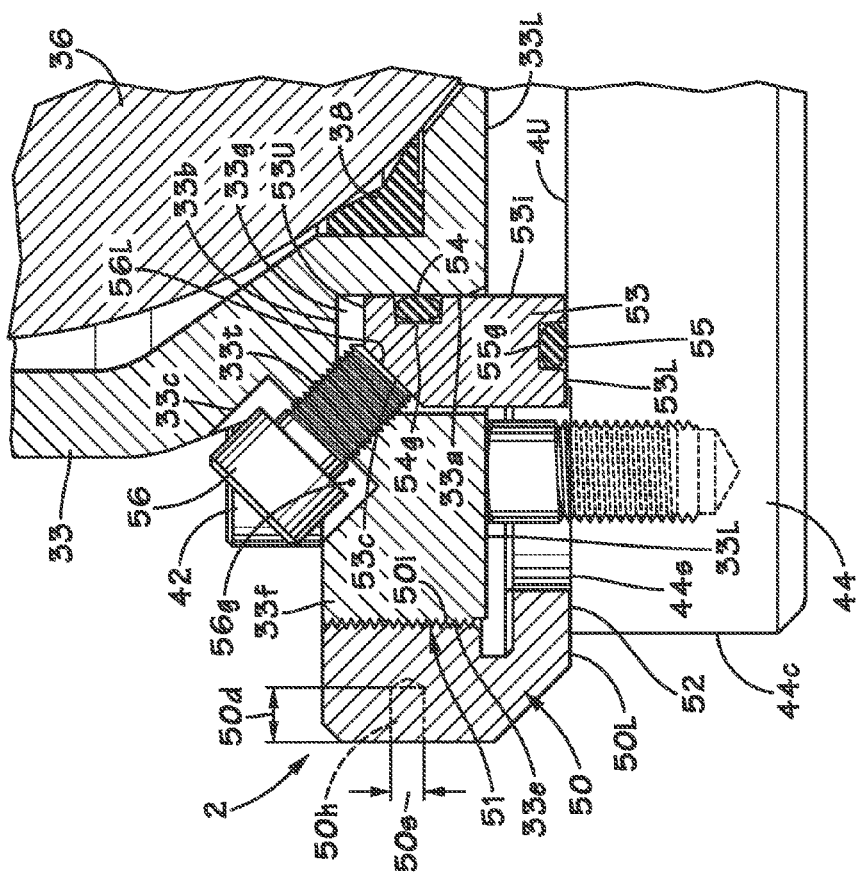
FIG. 4a
FIG. 4b

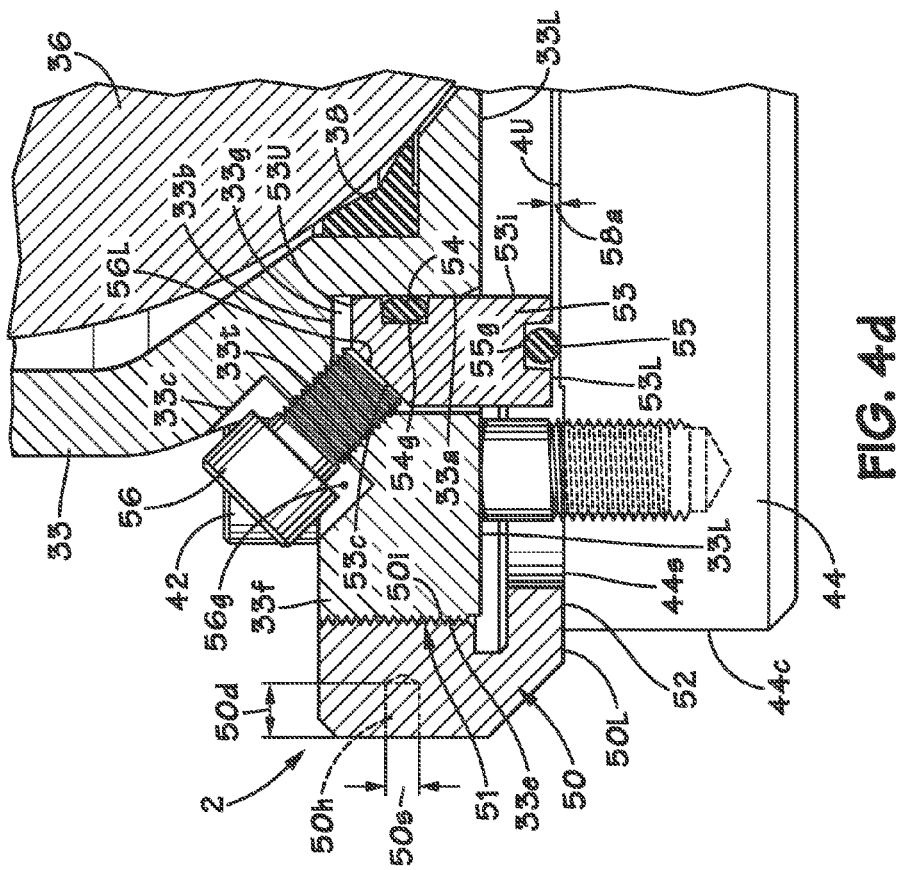
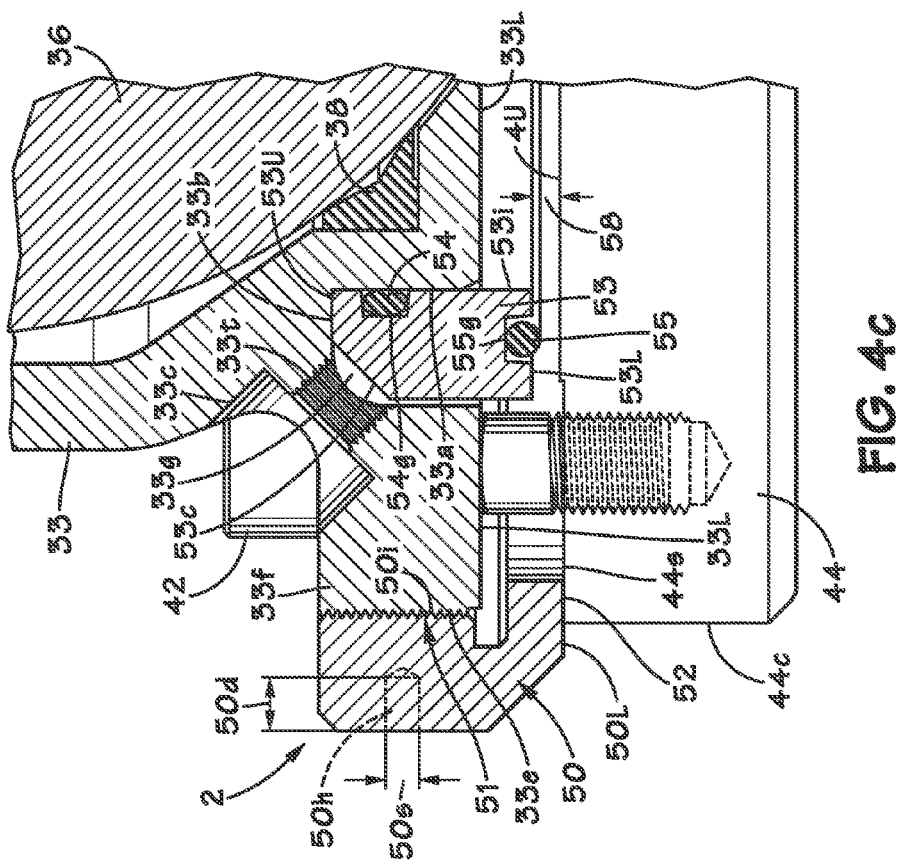
FIG. 4d
FIG. 4c

LENGTH-ADJUSTABLE PRESSURE-RETAINING PIPING COMPONENTS

BACKGROUND

1. Field of the Disclosure

Generally, the present disclosure relates generally to piping manifolds used for transferring liquid chemical and/or petroleum-based products between facilities used for storing the products, such as tanks, vessels, drums, and the like, and vehicles using for transporting the liquid products, such as railroad cars, trucks, barges, ships, and the like. More specifically, the present disclosure relates to the pressure-retaining piping components used to facilitate process liquid flow between the multiple pipes making up a piping system and/or piping manifold used for directing flow from multiple sources to multiple destinations.

2. Description of the Related Art

Many different types of pressure-retaining components are typically used in the piping systems designed for transferring chemical and/or petrochemical products to and from multiple product sources and multiple product destinations. For example, a variety of commonly available piping components, such as pipes, fittings, flanges, valves, vessels, drums, tanks, and the like, in an assortment of different sizes, arrangements, and materials, may be used under various process conditions to facilitate these product transfer activities.

In an effort reduce the overall complexity and other attendant problems associated with the use of multiple pipes, multiple flexible lines, and/or multiple hoses—as may commonly be employed in many loading/transfer systems—some applications may utilize large piping manifold assemblies, each of which may include several different inlet lines and several different outlet lines, many of which may be shop fabricated and skid-mounted for transportation to the transfer facility site. Furthermore, current design approaches for skid-mounted transfer manifolds have led to more and more compact assemblies, which generally permit more piping headers and valves to be used in the same or even smaller volume, thus allowing more equipment to be included on a given skid size, while still providing a manifold system that can be economically transported.

Moreover, these piping manifolds that are typically made up of numerous inlet and outlet lines may be designed to handle (i.e., transfer and/or load) multiple different chemical and/or petrochemical products on a substantially continuous basis. Therefore, the amount of time that may be available to perform commonly required maintenance activities, such as inspection, repair, replacement, and the like, may be substantially reduced, as manifold downtime may translate directly into lost loading/transfer capabilities, and commensurately into lost revenues. In general, then, there is a need to reduce the amount of time that may otherwise be required to perform routine maintenance on the equipment making up these types of loading and/or transfer manifolds, such as, for example, valve replacement and the like, while still ensuring that overall quality concerns are still addressed. However, in many applications, due to the increasingly compact manifold designs currently being implemented, easy access to equipment for inspection and/or removal may be significantly impacted, thereby translating directly into additional time that may be required to perform the necessary maintenance.

For example, in some system designs wherein a large number of valves are used to control the flow through the piping manifold, the valves may be installed in the manifold with a fitting make-up—e.g., flange-to-flange or seal face-to-seal face—to adjacent piping components. Such a fitting make-up is commonly not a problem in shop fabricated, skid-mounted manifolds, as the valve installation may be executed as part of a well-planned fabrication sequence so as to avoid clearance and/or space problems. However, efforts to remove a single valve randomly located in a large skid may be problematic for several reasons. First, with fitting make-up, the possibility of causing seal face damage to the valve, the mating piping components, or both, may significantly increase, as there may be very little space to handle and maneuver the valve into and/or out of position when being installed and/or removed. Such seal face damage may lead to connection leakage during manifold operation, a situation that may of itself require additional manifold maintenance activities to be performed. Furthermore, the compact nature of the piping manifolds in general may lead to assemblies that are, overall, very stiff—in other words, not very flexible. Any attempts which may be made to "cold spring" the piping components so as to allow more space to remove a valve that is being taken out of service, or to fit up a replacement valve, may lead to damage of the adjacent equipment, leakage at pressure joints, or both. Moreover, many operators may specifically prohibit the use "cold springing" during valve installation.

Accordingly, there is a need to provide a robust design for the pressure-retaining piping components and other equipment used in the fabrication of piping systems and/or piping manifolds that is also maintenance-friendly, so as address or reduce at least some of the problems outlined above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the subject matter disclosed herein relates to length-adjustable pressure-retaining components used in piping systems. In one illustrative embodiment, a device comprising a first pressure component and an adjustable spacer ring operatively coupled to the first pressure component is disclosed, wherein the adjustable spacer ring is adapted to adjust a combined overall length of said the pressure component and the adjustable spacer ring.

In another illustrative embodiment of the present disclosure, a device is disclosed that includes a first pressure component, a second pressure component, and a movable sealing component that is axially movable relative to the first and second pressure components. Furthermore, the movable sealing component is positioned between the first and second pressure components and is adapted to affect a pressure-tight seal between a circumferential surface of the first pressure component and a radial surface of the second pressure component. The disclosed device also includes a means for moving the movable sealing component relative to the first and second pressure components.

Also disclosed herein is an illustrative embodiment of a length-adjustable pressure-retaining device comprising a first pressure component a spacer ring operatively coupled to the first pressure component that is adapted to adjust an overall combined length of the first pressure component and the spacer ring by moving relative to an end of the first pressure component and a face of a second pressure component positioned adjacent thereto. Furthermore, the spacer ring is also adapted to transfer a load used for fixedly attaching the first pressure component to the second pressure component. The illustrative length-adjustable pressure-retaining device also comprises a movable sealing element adapted to move relative to the end of the first pressure component and a sealing surface of the second pressure component. Moreover, the movable sealing element is further adapted to provide a pressure-tight seal between the first and second pressure components.

Another illustrative embodiment of a length-adjustable pressure assembly of the present disclosure includes a first pressure-retaining component having first and second ends, wherein the first end is adapted to sealingly engage a first sealing surface of a first mating pressure part. The length-adjustable pressure assembly further includes a second pressure-retaining component adapted to sealingly engage the second end of the first pressure-retaining component and a second sealing surface of a second mating pressure part, wherein the distance between the first sealing surface and the second sealing surface is greater than the first overall length of the first pressure-retaining component. Additionally, the length-adjustable pressure assembly also includes a spacer ring adapted to adjust the overall combined length of the first pressure-retaining component and the spacer ring between at least a first overall length that is less than the distance between the first and second sealing surfaces and a second overall length that is substantially the same as the distance between the first and second sealing surfaces.

Also disclosed herein is an illustrative embodiment of a valve assembly adapted to permit fluid communication between a first piping component and a second piping component, the valve assembly comprising a valve having a first length, a first split body assembly comprising means for sealingly engaging an opening in the first piping component, and means for sealingly engaging a first end of the valve. The valve assembly further comprises a second split body assembly comprising means for sealingly engaging an opening in the second piping component, and means for sealingly engaging a second end of the valve, wherein the distance from the first sealing surface of the first split body assembly to the second sealing surface of the second split body assembly is greater than the first length of the valve. Moreover, the valve assembly also includes means for adjusting the length of the valve from at least the first length to at least a second length that is greater than the first length, wherein the second length is substantially the same as the distance from the first sealing surface to the second sealing surface.

The present subject matter also discloses an illustrative method of adjusting a length of a pressure-retaining component that includes positioning a movably adjustable sealing element at a first end of the pressure-retaining component, and operatively coupling a length-adjustable spacer ring to the first end of the pressure-retaining component. The method further includes positioning the first end of the pressure-retaining component adjacent a sealing surface of a first mating pressure component, wherein a first sealing surface of the movably adjustable sealing element is a first axial distance from the sealing surface of the first mating pressure component, and a face of the length-adjustable spacer ring is a second axial distance from the sealing surface of the first mating pressure component. Furthermore, the illustrative method also comprises movably adjusting the length of the length-adjustable spacer ring relative to the first end of the pressure-retaining component until the face of the length-adjustable spacer ring contacts a contact surface of the first mating pressure component.

In yet another illustrative embodiment of the present disclosure, a method of installing a length-adjustable valve in a piping system is disclosed that includes adjusting the length of the length-adjustable valve to a first valve length and positioning the length-adjustable valve between a first sealing surface of a first piping component of the piping system and a second sealing surface of a second piping component of the piping system, wherein the distance between the first and second sealing surfaces is greater than the first valve length. The disclosed method further comprises adjusting the length of the length-adjustable valve from the first valve length to a second valve length greater than the first valve length after positioning the length-adjustable valve between the first and second sealing surfaces, wherein the second valve length is substantially the same as the distance between the first and second sealing surfaces.

BRIEF DESCRIPTION OF THE DRAWINGS

The disclosure may be understood by reference to the following description taken in conjunction with the accompanying drawings, in which like reference numerals identify like elements, and in which:

FIG. 3 is a cross-sectional view of an illustrative embodiment of a valve assembly comprising an illustrative length-adjustable spacer ring assembly disclosed herein;

FIGS. 4a-4d are cross-sectional views of an illustrative length-adjustable spacer ring of an illustrative valve assembly disclosed herein.

Figure 1:
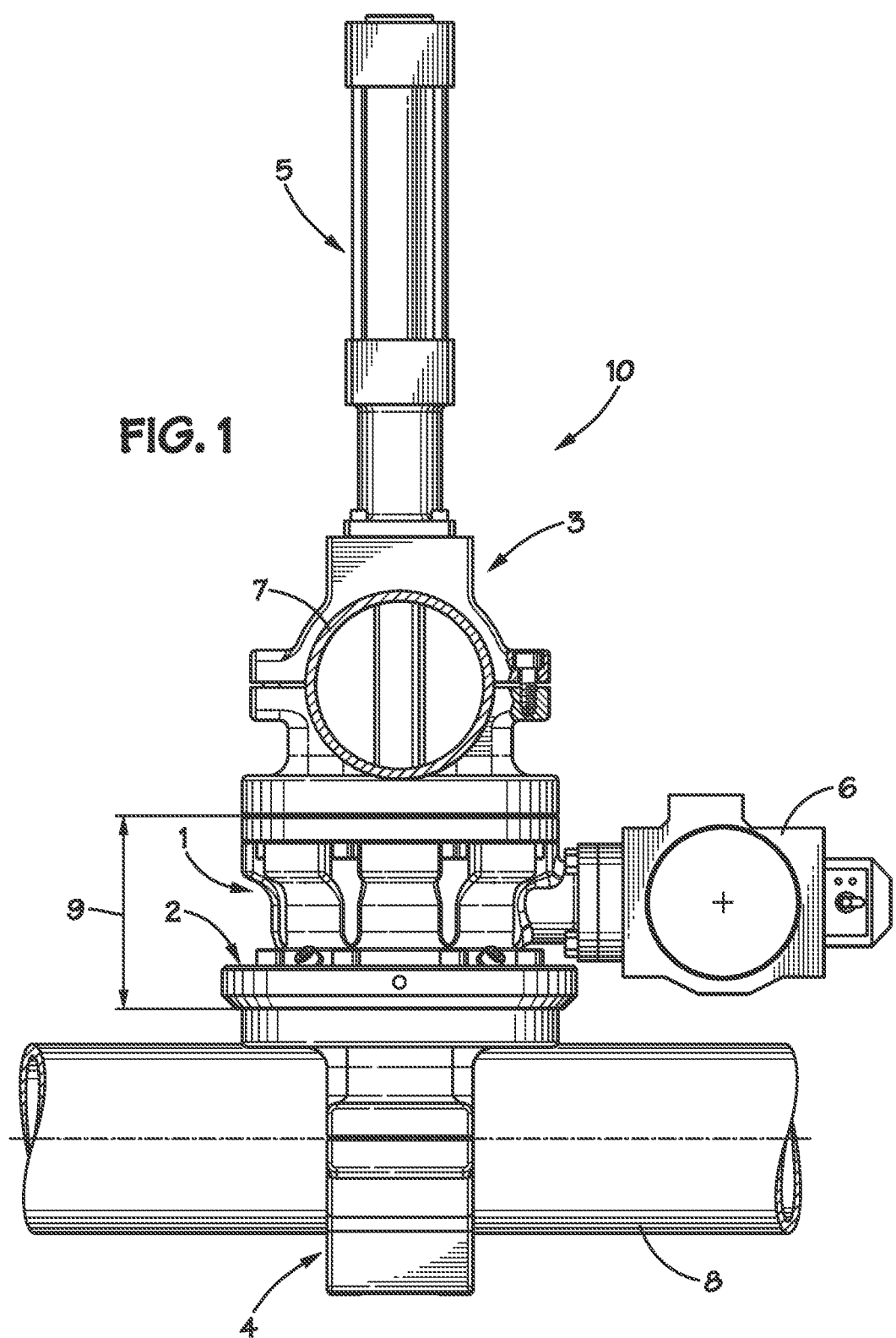
FIG. 1 is an elevation view of a an illustrative embodiment of a valve assembly comprising an illustrative a length-adjustable spacer ring assembly disclosed herein.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein provides various embodiments of a length-adjustable spacer ring assembly that can be used to adjust the overall length of pressure-retaining components, such as piping components and the like, so as to ensure a proper fit and pressure-tight seal between the adjacent sealing surfaces of other pressure-retaining components, such as within a piping system or piping manifold.

In certain illustrative embodiments, the length-adjustable spacer ring assembly may be used in conjunction with a pressure-retaining component, such as a valve assembly and the like, wherein the length of the valve assembly can be adjusted as required to ensure a proper fit and seal between flow lines. For example, in some illustrative embodiments of the length-adjustable valve assembly of the present disclosure, prior to installation in a piping system or piping manifold, the overall length of the valve assembly may be adjusted (i.e., decreased) to be less than the spacing between the opposing sealing surfaces of piping components through which the valve assembly may regulate flow—such as flow lines, transfer lines, loading lines, and the like—such that the valve assembly may be positioned between the opposing sealing surfaces without resorting to the use of mechanical devices to separate the sealing surfaces by, for example, spreading or "springing" the piping components, so as to provide adequate clearance for installing the valve. Thereafter, the overall length of the valve assembly may be re-adjusted (i.e., increased) so that the sealing surfaces on the top and bottom of the valve are in proper sealing contact with the respective mating opposing sealing surfaces of the piping components through which the valve may regulate flow.

It should be understood that, unless otherwise specifically indicated, any relative positional or directional terms that may be used in the descriptions below—such as "upper," "lower," "above," "below," "over," "under," "top," "bottom," "vertical," "horizontal," "toward," "away," and the like—are used for convenience, and should be construed in light of that term's normal and everyday meaning relative to the depiction of the components or elements in the referenced figures. Additionally, references herein to the term "length-adjustable" generally refer to the axial length of piping components, irrespective of the actual orientation of those piping components within a piping system or piping manifold, wherein the fluid flow through the piping component may be substantially along longitudinal axis of the component. Accordingly, the principles described may equally apply to piping components wherein fluid flow may be along a either a vertical axis or a horizontal axis with respect to ground, or at any angle therebetween. Accordingly, it should be understood that references to the term "length-adjustable" for piping components that may have a longitudinal axis that is substantially horizontally oriented may be considered to be equivalent to a term "height-adjustable" for piping components that may have a longitudinal axis that is substantially vertically oriented. Moreover, it should also be understood that in any actual application or installation, the illustrative valve assemblies disclosed herein may be positioned and/or rotated to any angle relative to the orientations depicted in the attached figures and described herein.

FIG. 1 is an elevation view of an illustrative valve assembly 10 comprising a length-adjustable spacer ring assembly 2 of the present disclosure. As shown in FIG. 1, the valve assembly 10 may comprise a valve 1, which in certain illustrative embodiments is positioned between an upper split body assembly 3 and a lower split body assembly 4. Depending on the application requirements, the valve 1 may be any one of several valve types well known in the art, such as, for example, a ball valve, gate valve, check valve, butterfly valve, globe valve, and the like, whereas in at least one illustrative embodiment of the present disclosure the valve 1 may be a ball valve. In some embodiments, the valve 1 may comprise a length-adjustable spacer ring assembly 2 that is adapted for adjusting the combined overall as-installed length 9 of the valve 1 and length-adjustable spacer-ring assembly 2, as will be discussed in further detail with respect to FIGS. 3 and 4a-4c below.

As shown in FIG. 1, the upper split body assembly 3 may be clamped around an upper piping component 7, and may further comprise a sealing means (not shown) for providing a pressure-tight seal around an opening (not shown) located in the upper piping component 7 proximate the interface of the upper split body assembly 3 and the valve 1, and which facilitates fluid communication between the upper piping component 7 and the valve 1. Similarly, the lower split body assembly 4 may, in certain illustrative embodiments, be clamped around a lower piping component 8, and may also comprise a sealing means (not shown) for providing a pressure-tight seal around an opening (not shown) located in the lower piping component 8 proximate the interface of the lower split body assembly 4 and the valve 1, thereby facilitating fluid communication between the lower piping component 8, the valve 1, and the upper piping component 7.

In some illustrative embodiments, the upper and/or lower piping components 7, 8 may comprise, for example, a tubular product such as pipe, that may commonly be used for moving fluids, such as water, chemicals, petroleum products, and the like, from one location to another. Furthermore, the sizes of the respective upper and lower piping components 7, 8 may vary from application to application, and may be adjusted as required to meet the overall operating conditions, such as flow rate, pressure, and the like, specified for the valve assembly 10 and/or any piping system within which the valve assembly 10 may operate. For example, the nominal sizes of the upper and lower piping components 7, 8 may in some illustrative embodiments be as small as 2" NPS (nominal pipe size), and in other embodiments may be as large as 12" NPS, or even larger. Furthermore, depending on the application requirements, in some embodiments the nominal sizes of the upper and lower piping components 7, 8 may be the same (e.g., both may be 4" pipes), whereas in other embodiments the sizes of the upper and lower piping components 7, 8 may be different. For example, in certain embodiments, the upper piping component 7 may be a 2" or 3" pipe, whereas the lower piping component 8 may be larger, such as, for example, a 4" or 6" pipe. In other embodiments, the upper piping component 7 may have a larger nominal size than the lower piping component 8. Other nominal size combinations may also be used.

Generally, the nominal size of the valve 1 will match the nominal size of the larger of the two piping components 7, 8. For example, in an embodiment of the present disclosure wherein the upper and lower piping components 7, 8 are both a 3" nominal size, then the valve 1 will be a nominal 3" valve. On the other hand, in an illustrative embodiment wherein the upper piping component 7 is a 4" pipe and lower piping component 8 is a 3" pipe, then the valve 1 will nominally be a 4" valve.

As shown in FIG. 1, in some illustrative embodiments of the valve assembly 10, the upper split body assembly 3 may also comprise a pig stopper 5 that is adapted for regulating the movement of a pipe pig (not shown) through the upper piping component 7, depending on the overall flow requirements of the piping system within which the valve assembly 10 may operate. In those embodiments employing the use of pig stopper 5, the upper split body assembly 3 may be also be adapted to provide a pressure seal around an opening (not shown) located in the upper piping component 7 proximate the interface of the upper split body assembly 3 and the pig stopper 5. Additionally, depending the system requirements, the lower split body assembly 4 may, in some illustrative embodiments, also comprise a pig stopper 5 as described above.

In certain embodiments, the valve assembly 10 may also comprise a valve actuator 6 that is adapted for opening and/or closing the valve 1, depending on system conditions and/or operators instructions. For example, and depending on the overall piping system design, it may be desired to move, or transfer, a process fluid, such as a liquid chemical product, a petroleum product, and the like, from a first piece of shipping and/or storage equipment (not shown) that may be connected to the upper piping component 7 to a second piece of shipping and/or storage equipment (not shown) that may be connected to the lower piping component 8. To facilitate such an operation, a signal may be that instructs the valve actuator 6 to open the valve 1 so as to thereby permit process fluid to flow from the first piece of shipping and/or storage equipment (not shown), through the upper piping component 7, through the valve 1, through the lower piping component 8, and to the second piece of shipping and/or storage equipment (not shown). Depending on the system design, the signal instructing the valve actuator 6 to open the valve 1 may be sent manually, e.g., by an operator, or it may be sent automatically, e.g., by equipment designed to interpret and respond to certain predetermined conditions, such as pig detection and the like. Thereafter, once the product transfer is complete, a signal may be sent—either manually or automatically, depending on the system design—instructing the valve actuator 6 to close the valve 1.

Figure 2A:
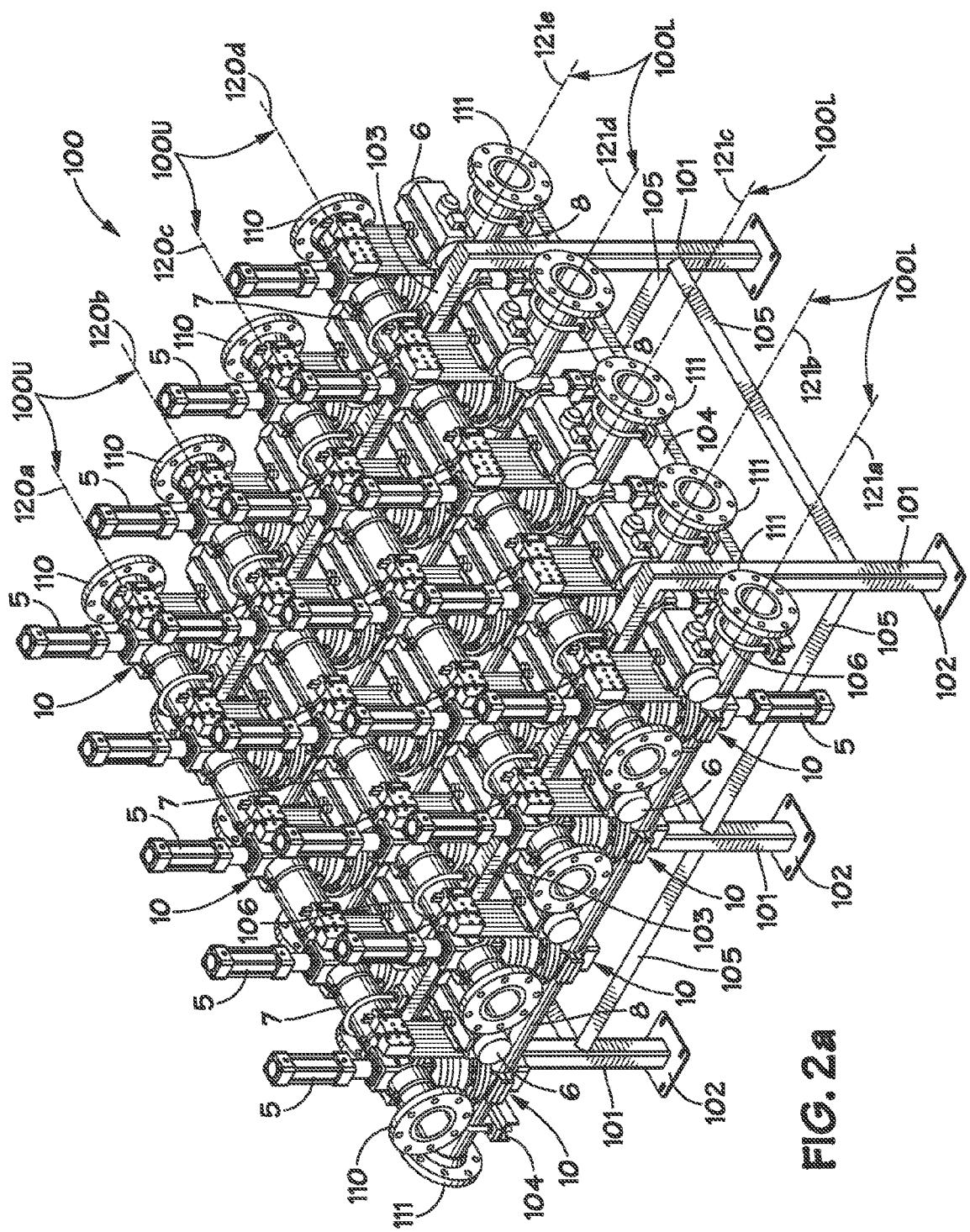
FIGS. 2a-2c are various views of an illustrative piping manifold comprising a plurality of illustrative valve assemblies of FIG. 1.
Figure 2B:
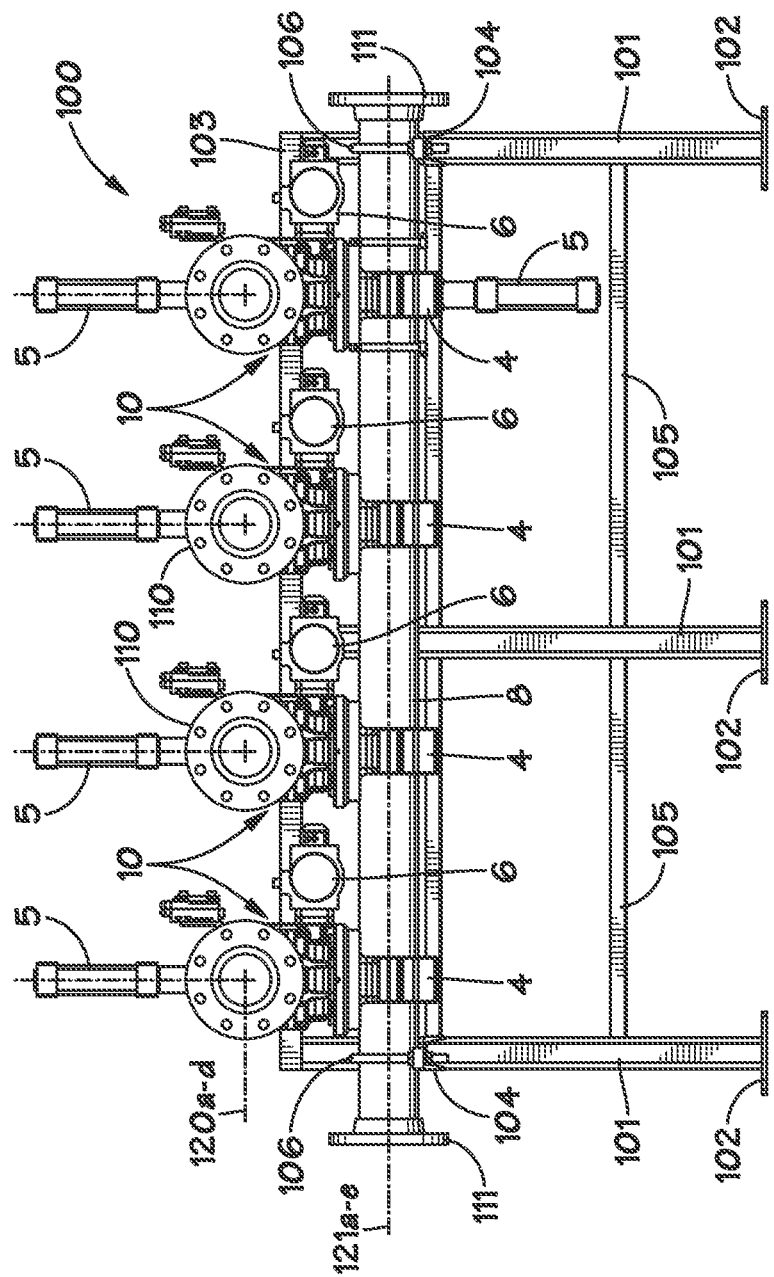
Figure 2C:
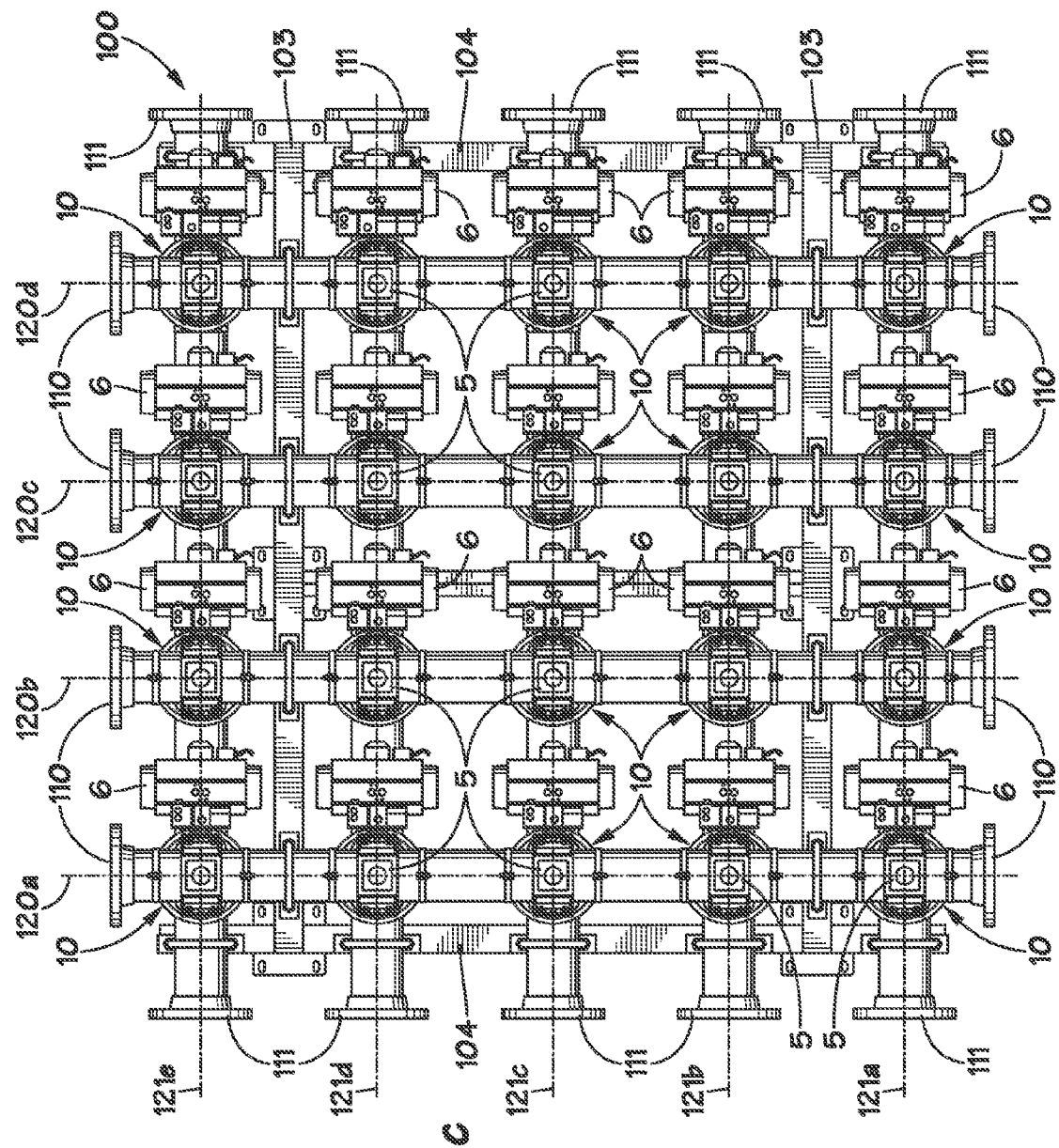

FIGS. 2a-2c depict a further illustrative embodiment of the present disclosure, wherein a plurality of the valve assemblies 10 have been assembled into a piping manifold 100. FIG. 2a is an isometric view, FIG. 2b is an elevation view, and FIG. 2c is a plan view of the illustrative piping manifold 100. The piping manifold 100 of FIG. 2a-2c may comprise an upper level 100U comprising four rows 120a-120d of upper piping components 7 and a lower level 100L comprising five rows 121a-121e of lower piping components 8. Also as shown in the illustrative embodiment of FIGS. 2a-2c, a valve assembly 10 may be positioned at the intersection of each upper piping component 7 and each lower piping component 8, for a total of twenty valve assemblies 10 (i.e., 4×5=20). Furthermore, in the embodiment shown in FIG. 2a, each valve assembly 10 comprises a pig stopper 5 attached to each of the upper split bodies 3, whereas only valve assemblies 10 attached to row 120d of the upper level 100U comprise a pig stopper 5 attached to the lower split bodies 4. As shown in FIGS. 2a-2c, in some embodiments, each row 120a-120d of upper piping components 7 may comprise a flanged connection 110 at each end so that each upper piping component 7 may be attached to other piping components (not shown), such as flow lines, transfer lines, and the like, or to other similarly designed piping manifolds 100, thereby expanding the overall capability of the system. In other illustrative embodiments, each row 121a-121e of lower piping components 8 may comprise a flanged connection 11 at each end, again to facilitate connection each lower piping component 80 to other piping components (not shown) or manifolds 100.

As shown in FIGS. 2a-2c, the piping manifold 100 may comprise a plurality of support legs 101, each of which may comprise a base plate 102 for fixedly attaching the piping manifold 100 to a structure, foundation, or other type of support. The piping manifold 100 may also comprise upper cross-member supports 103 attached to two or more of the support legs 101, and which are adapted to support the rows 120a-120d of upper piping components 7. In some embodiments the piping manifold 100 may also comprise lower cross-member supports 104 adapted to support the rows 121a-121e of lower cross-member supports 104, also attached to two or more of the support legs 101, and which are adapted to support the rows 120a-121e of lower piping components 8. Additionally, in certain embodiments of the presently disclosed subject matter, each of the upper and lower piping components 7, 8 may be secured to each of the upper and lower cross-member supports 103, 104, respectively, using a suitably designed hold-down 106, several types of which are well known in the art. For example, in one illustrative embodiment, the hold-downs 106 may comprise an appropriately sized U-bolt and saddle assembly. Furthermore, the piping manifold 100 may also comprise suitably sized and positioned cross-braces 105 between running between the support legs 101 so as to provide enhanced structural stability to the piping manifold 100.

It should be appreciated that the number of rows of upper and lower piping components 7, 8 in the upper and lower levels 100U, 100L of the piping manifold 100 may be modified as required to meet the overall distribution demands of the piping system design. For example, whereas the illustrative piping manifold 100 depicted in FIGS. 2a-2c represents what is considered to be a "4×5" manifold (i.e., four upper piping components 7 by five lower piping components 8), piping manifolds may be similarly designed which have an equal number of rows of upper and lower piping components 7, 8, such as a "5×5" manifold or a "6×6" manifold, and the like. Furthermore, other equal and non-equal combinations of upper and lower piping components 7, 8 may also be used, such as, for example, a "3×4" manifold, a "4×6" manifold, a "4×8" manifold, and the like. Moreover, several manifolds may be assembled together to form larger manifold assemblies, as noted previously. For example, in one illustrative embodiment, four "4×5" manifolds may be assembled together to comprise a "16×20" manifold. Other sizes and combinations may also be used.

Figure 5A:
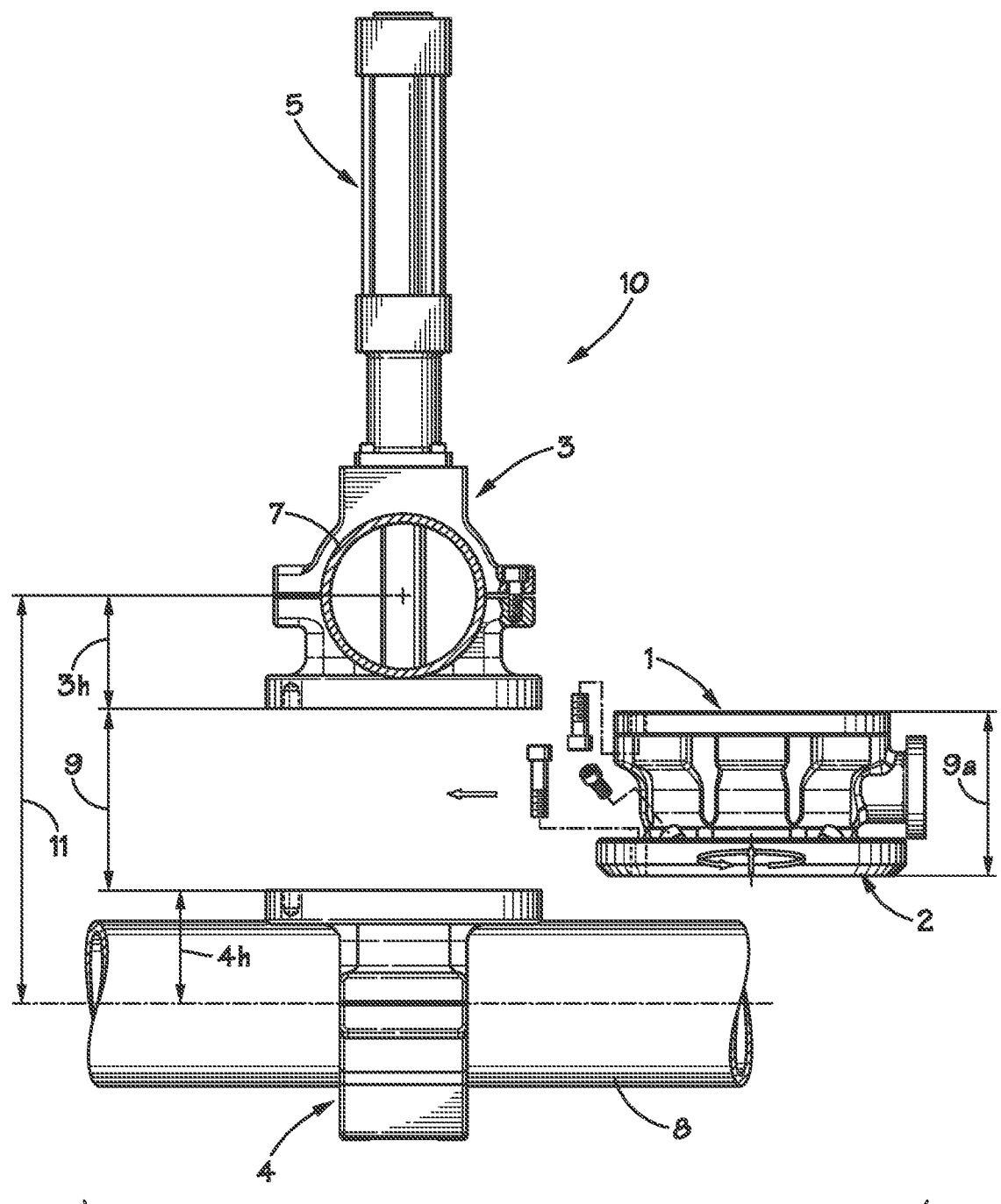
FIGS. 5a-5c are elevation views of an illustrative embodiment of the valve assembly disclosed herein during installation of an illustrative valve comprising an illustrative length-adjustable spacer ring assembly disclosed herein.
Figure 5B:
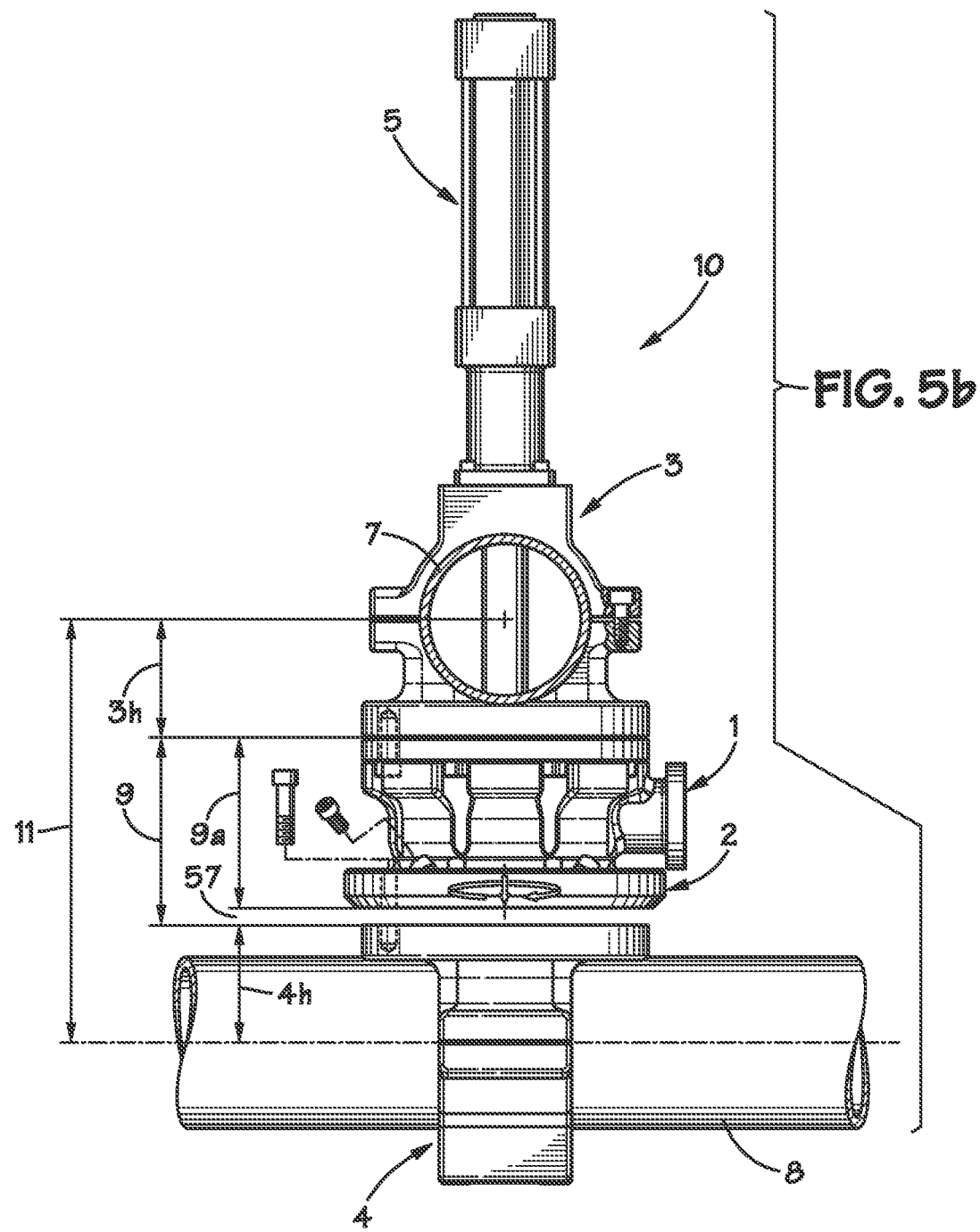
Figure 5C:
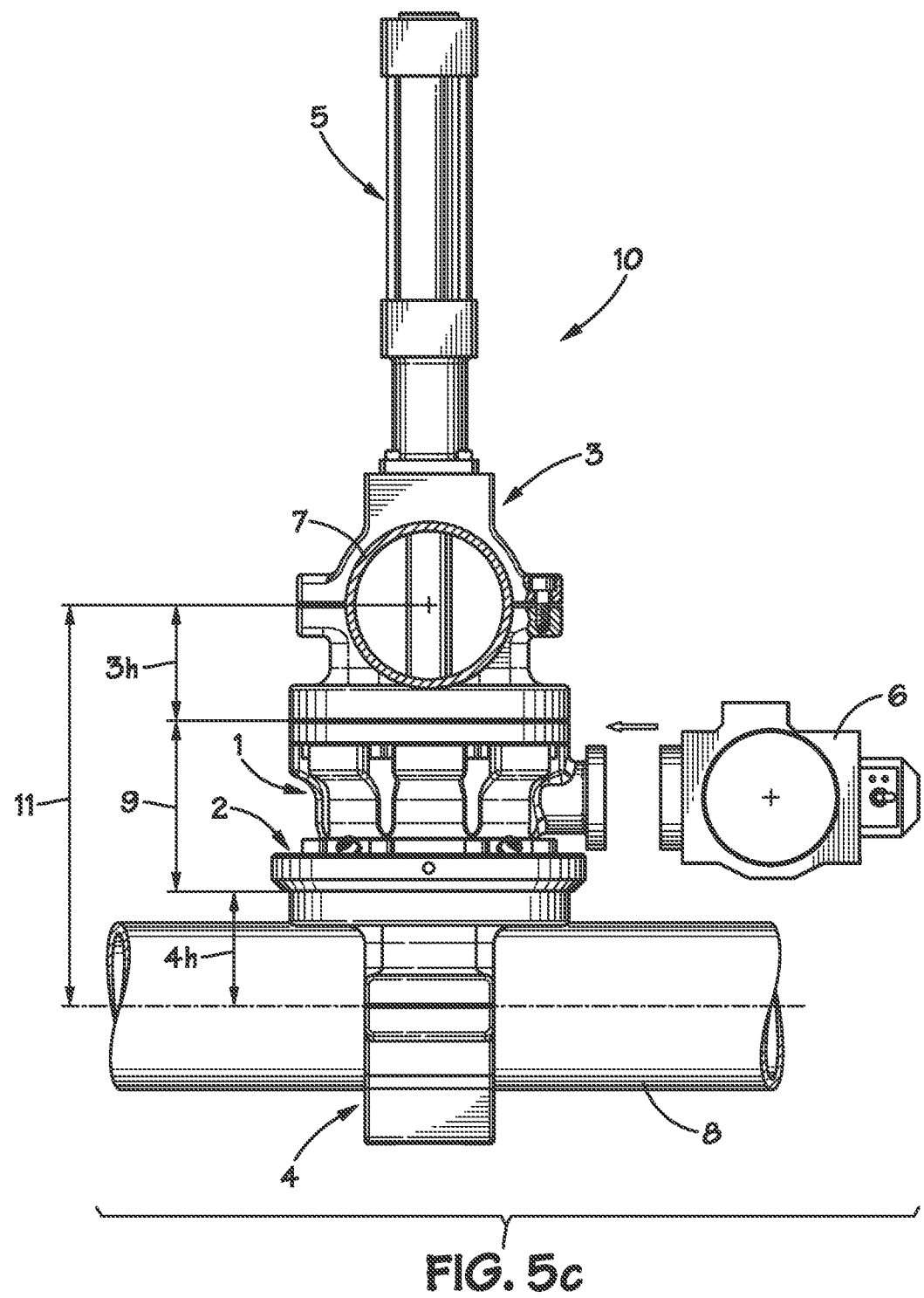

Additionally, it should be further appreciated that, in certain illustrative embodiments of the present disclosure, the piping manifold 100 may be oriented in a substantially horizontal plane—i.e., as illustrated in FIGS. 5a-5c. In other illustrative embodiments, however, and depending on various parameters of the overall piping system design requirements for the specific manifold installation, such as the piping layout, footprint size, space availability, and the like, the piping manifold 100 may be oriented in a substantially vertical plane—i.e., substantially perpendicular to the layout of the piping manifold 100 depicted in FIGS. 5a-5c. Moreover, as design consideration may dictate, the orientation of the piping manifold 100 may vary at any angle between the horizontal plane illustrated in FIGS. 5a-5c and the substantially vertical plane described above.

FIGS. 3 and 4a-4b, illustrating details of some illustrative embodiments of the valve assembly 10 disclosed herein, will now be discussed.

FIG. 3 is a cross-sectional view of a valve assembly 10 accordingly to some illustrative embodiments of the present disclosure. As shown in FIG. 3, the upper split body assembly 3 may comprise a first split body clamp 21 and a second split body clamp 22, and a means for clamping the first and second split body clamps 21, 22 around the upper piping component 7 (not shown in FIG. 3; see, FIG. 1), which, in certain embodiments, may be by using a plurality of fasteners 23. The first and second split body clamps 21, 22 may be fabricated from any one of several suitable material types and product forms that may typically be used for manufacturing valve components, and which lend themselves to the forming and/or machining activities necessary to obtain the requisite shape, surface finish, strength, and the like. Depending on the overall design considerations, such as size, strength, process environment, cost, and the like, the first and second split body clamps 21, 22 may be fabricated from cast or wrought product forms, and may comprise one or more of several well known and commonly used carbons steel, stainless steel, or high alloy steel materials. By way of example only, in certain illustrative embodiments, the first and second split body clamps 21, 22 may be fabricated from castings or forgings, which in some embodiments may comprise carbon steel material, and in other embodiments may a 300 series stainless material, such as 304 stainless, 316 stainless, and the like.

As noted previously, one means for clamping the first and second split body clamps 21, 22 around the upper piping component 7 may be by using a plurality of fasteners 23. In some illustrative embodiments, the clamping means may also comprise providing lips or flanged portions 21f, 22f on the first and second split body clamps 21, 22, respectively, so as to provide a structural component on which the fasteners 23 may operate. Depending on the design conditions and nominal size of the valve assembly 10, as well as the size of the flanged portions 21f, 22f and the space available for the fasteners 23 therein, the type and size of fasteners 23 used to clamp the first and second split body clamps 21, 22 around the upper piping component 7 may vary. For example, in some illustrative embodiments, wherein available space may be limited and a compact design may be desirable, the fasteners 23 may be threaded fasteners such as, for example, socket head cap screws and the like, and wherein one of the flanged portions 21f, 22f may have a tapped—or internally threaded—hole, with threads sized to engage with those of the socket head cap screw fasteners 23. The fasteners 23 shown in FIG. 3 are illustrative of the socket head cap screw/tapped hole configuration described above. In other illustrative embodiments, wherein space may not be at a premium and sufficient wrench clearance may be available from at least one side of the flanged portions 21f, 22f, the fasteners 23 may be stud bolts with hex nuts and/or hex head machine bolts. For example, if adequate access may be available from both sides of the flanged portions 21f, 22f, a through-bolting configuration may be used in some embodiments, wherein a stud bolt may be used with a hex nut at each end, or wherein a hex head machine bolt may be used with a hex nut at an end opposite of the hex head. In other illustrative embodiments, a tapped hole configuration may be used as described above, in which case a stud bolt may be threadably engaged into the tapped hole and a single hex nut used to clamp the first and second split body clamps 21, 22 together, or a hex head machine bolt may be used without a hex nut, similar to the socket head cap screw configuration discussed above. Depending the combination of factors previously described, other fastener configurations may also be used.

In those illustrative embodiments wherein the fasteners 23 are threaded fasteners such as socket head cap screws, stud bolts, headed machine bolts, and the like, the fasteners 23 may comprise, for example, high strength and/or heat treated carbon or low alloy steel material, high strength and/or strain hardened stainless steel material, and the like. Other material types may also be utilized, depending on overall design requirements.

As noted with respect to FIG. 1 above, to facilitate fluid communication between the upper piping component 7 and the valve 1, an opening may be located in the upper piping component 7 proximate the interface of the upper split body assembly 3 and the valve 1. In some illustrative embodiments, a sealing means may be provided so as to obtain a pressure-tight seal between the inside surface 22i of the second split body clamp 22 and the outside surface of the upper piping component 7 (not shown)—thereby preventing leakage that may occur as a result of the opening in the upper piping component 7 and the corresponding fluid communication between the upper piping component 7 and the valve 1. In some embodiments, the sealing means may comprise, for example, a seal ring 24 disposed in a seal ring groove 24g located on the inside surface 22i of the second split body clamp 22, and surrounding the opening in the upper piping component 7. In certain embodiments, a pressure-tight seal may be affected between the inside surface 22i of the second split body clamp 22 and the outside surface of the upper piping component 7 when, during assembly of the upper split body assembly 3, the first and second split body clamps 21, 22 are clamped around the upper piping component 7 using the a clamping means, such as fasteners 23 and flanged portions 21f, 22f, thereby compressing the seal ring 24 against the outside surface of the upper piping component 7 and the bottom and/or side surfaces of the seal ring groove 24g. Depending on specific design requirements, such as temperature and process environment, the seal ring 24 may be a flexible elastomeric seal ring, such as an O-ring seal and the like, and may comprise any one of several well known thermoset synthetic rubbers, such as nitrile rubber, butyl rubber, silicone rubber, neoprene, fluoroelastomers, and the like. Other suitably selected materials may also be used.

Also as noted previously, in those illustrative embodiments of the present disclosure that employ the use of pig stopper 5, the upper split body assembly 3 may be also include a sealing means adapted to provide a pressure-tight seal around an additional opening in the upper piping component 7, located proximate the interface of the upper split body assembly 3 and the pig stopper 5. As discussed above with respect to the sealing means used to obtain a pressure-tight seal around the opening in the upper piping component 7 located proximate the valve 1, the sealing means used to affect a pressure-tight seal between the inside surface 21i of the first split body clamp 21 and the outside surface of the upper piping component 7 may, in some illustrative embodiments, be substantially similar. That is, in some embodiments, the sealing means may comprise a seal ring 25, such as an O-ring and the like, which may be disposed in a seal ring groove 25g located on the inside surface 21i of the first split body clamp 21 and surrounding the opening in the upper piping component 7. Thereafter, the seal ring 25 may be compressed against the outside surface of the upper piping component 7 and the bottom and/or side surfaces of the seal ring groove 25g during the assembly of the upper split body around the upper piping component 7. Furthermore, when the seal ring 25 is an O-ring, the material comprising the O-ring seal 25 may be selected as noted with respect to seal ring 24 above.

As shown if FIG. 3, in certain embodiments, the pig stopper 5 may be installed into an opening 21a at the upper end of the first split body clamp 21, and attached thereto by a plurality of threaded fasteners 26 adapted to engage tapped holes formed in the upper end of the first split body clamp 21. As discussed above with respect to fasteners 23, depending on the available space, in some illustrative embodiments the threaded fasteners 26 may be socket head cap screws (i.e., for tight spacing requirements), whereas in other embodiment the threaded fasteners 26 may be hex head machine bolts (i.e., when adequate wrench clearance may be available).

In order to ensure that a pressure-tight seal is maintained between the pig stopper 5 and first split body clamp 21, in some illustrative embodiments a seal ring 27, such as an O-ring seal and the like, may be disposed between the lower end 5L of the pig stopper 5 and the bottom surface 21b of the opening 21a. To obtain the pressure-tight seal, the seal ring 27 may be compressed between the bottom surface 21b of the opening 21a and the lower end 5L of the pig stopper 5 when the threaded fasteners 26 are tightened during the installation of the pig stopper 5. Additionally, as noted with respect to seal rings 24 and 25 above, when the seal ring 27 is an O-ring, the material comprising the O-ring seal 27 may be as indicated previously.

During operation of the valve assembly 10, the shaft 28 of the pig stopper 5 may be extended as shown in FIG. 3 through the openings in the upper piping component 7 in order to control, as by blocking, the movement of a pipe pig through the upper piping component 7, as is well known to those skilled in the art. As shown in FIG. 3, the lower end 28L of the shaft 28 may extend into an opening 29a in the center of a pig stopper shaft support ring 29 positioned inside of the second split body clamp 22 and proximate the valve 1. During operation, the pig stopper shaft support ring 29 may support the lower end 28L of the shaft 28 when the shaft is impacted by a pipe pig, thereby preventing undue damage to the shaft 28 which could inadvertently deform the shaft 28 and prevent it from fully retracting into the body of the pig stopper 5. In some embodiments, the pig stopper shaft support ring 29 may comprise a circumferentially threaded section 29t to facilitate installation of the support ring 29 into a correspondingly threaded section 29t in the lower end of the second split body clamp 22 (i.e., proximate the valve 1) so as to thereby secure the pig stopper shaft support ring 29 in place.

Depending on overall design criteria for the valve assembly 10, the pig stopper support ring 29 may be fabricated from one of several well known wrought product forms commonly used for valve assembly parts of this type, such as, for example bar, plate, forgings, and the like. Furthermore, in certain illustrative embodiments, the material composition of the pig stopper support ring 29 may be selected as would be appropriate for the process environment to which it may be exposed, as noted for the upper split body assembly 3 above, such as carbon steel, stainless steel, high alloy steel, and the like. However, it should be recognized that materials comprising a high percentage by weight of nickel, such as 300 series stainless steel materials, high nickel alloy materials, and the like, can sometimes exhibit a tendency to gall when exposed to high bearing and/or sliding loading conditions against similar high-nickel content materials—for example, as in a threaded connection such as the threads 29t. Accordingly, in those embodiments of the present disclosure wherein the material composition of the second split body clamp 22 may be a 300 series stainless steel or high nickel alloy steel, and the pig stopper support ring 29 may be secured into the second split body clamp 22 by a threaded engagement 29t, it may be advantageous for the material composition of the support ring 29 to differ from that of the second split body clamp 22 so as to potentially avoid the possibility that galling may occur between the threads of the support ring 29 and the threads of the second split body clamp 22.

For example, in illustrative embodiments of the valve assembly 10 wherein the second split body clamp 22 comprises, for example, 316 stainless steel, the material composition of the pig stopper support ring 29 may be, for example, a carbon steel or low alloy steel. On the other hand, in designs wherein the process conditions may require that specific materials be used for both the second split body clamp 22 and the pig stopper support ring 22 so as to resist the effects of the fluid environment—such as, for example, a 300 series stainless steel—then a thread lubricant may used along the threaded engagement 29t to reduce or possibly eliminate the galling effects that may occur during installation of the pig stopper support ring 29.

Also as shown in FIG. 3, the valve assembly 10 may also comprise a means for fixedly attaching the upper split body assembly 3 to the valve 1 such that an upper sealing surface 3L of the second split body clamp 22 is in sealing contact with the upper sealing surface 32U of a valve bonnet 32 of the valve 1. In some embodiments of the present disclosure, the means for fixedly attaching the upper split body assembly 3 to the valve 1 may comprise, for example, a plurality of fasteners 30, as shown in FIG. 3. Furthermore, as previously discussed with respect to the fasteners 23 used to clamp the first and second split body flanges 21, 22 around the upper piping component 7, the fasteners 30 may be suitably sized threaded fasteners, the type of which may depend on the space available for access to and tightening of the fasteners 30. For example, in certain illustrative embodiments wherein the space available for access to the fasteners 30 may not be an issue, the fasteners 30 may be through-bolted studs with hex nuts, through-bolted hex head machine bolts with nuts, and the like. On the other hand, in those embodiments wherein a compact design may be required by space availability, wrench clearance, and the like, a tapped hole configuration may be utilized, and the fasteners 30 may be socket head cap screws as described above, and as depicted in the illustrative embodiment of the valve assembly 10 shown in FIG. 3. Furthermore, fastener sizes and materials may also be determined as previously discussed.

The valve assembly 10 shown in FIG. 3 may further comprise a sealing means adapted to provide a pressure-tight seal between the upper split body assembly 3 and the valve 1. In some illustrative embodiments, that sealing means may comprise, for example, a face seal, wherein a seal ring 31 may be disposed in a seal ring groove 31g formed in the upper sealing surface 32U of the valve bonnet 32. When the upper split body assembly 3 is fixedly attached to the valve 1, such as by the fasteners 30, and the like, the face seal may be obtained by compressing the seal ring 31 against the upper sealing surface 3L of the second split body clamp 22 and against the bottom and/or side surfaces of the seal ring groove 31g, thereby affecting a pressure-tight seal. As previously discussed with respect to seal rings 24, 25 and 27, in certain embodiments the seal ring 31 may be an O-ring seal, the material composition of which may be as noted above.

As shown in the illustrative embodiments of the valve assembly 10 of FIG. 3, the valve 1 may comprise a valve bonnet 32, a valve body 33, a valve element 36, and a valve stem 39. In those embodiments of the disclosed subject matter wherein the valve 1 may be a ball valve, the valve element 36 is a ball body adapted to circumferentially seal against an upper seal ring 37 disposed proximate the upper sealing surface 32U of the valve bonnet 32 and a lower seal ring 38 disposed proximate the lower end 33L of the valve body 33. The ball valve element 36 in FIG. 3 is shown in a closed position, thereby preventing fluid communication between the upper piping component 7 (not shown in FIG. 3; see, FIG. 1) and the lower piping component 9 (see, FIG. 1).

In some illustrative embodiments, the valve bonnet 32, the valve body 33, the valve element 36 and valve stem 39 may each be fabricated from any one of several well know wrought or cast product forms, such as bar plate, forgings, castings, and the like. Furthermore, the material composition of the valve bonnet 32, the valve body 33, the valve element 36 and valve stem 39 may each be selected based on appropriate engineering criteria, such as design conditions, strength requirements, cost considerations, manufacturing issues, and the like. For example, any one or all of these components may be fabricated from materials having substantially the same composition as that used for the components of the upper split body assembly 3, such as carbon steel material, stainless steel material, high alloy steel material, and the like. Moreover, not all components need be fabricated from materials having substantially the same material composition. For example, in some illustrative embodiments, the valve bonnet 32 and valve body 33 may comprise a carbon steel material, whereas the valve element 36 and the valve stem 39 may comprise a grade of stainless steel material. In other illustrative embodiments, the valve bonnet 32 and valve body 33 may comprise one grade of stainless steel material, such as 304 stainless, whereas the valve element 36 and the valve stem 39 may comprise a second grade of stainless steel material, such as 316 stainless, or the valve stem 39 may comprise yet a third grate of stainless steel material, such as a 17-4 PH grade. Other materials and material combinations may also be used.

The material composition of the upper and lower seal rings 37, 38 may be selected as required to satisfy the design and operating conditions of the valve assembly 10, such as temperature, process environment, and the like. In certain illustrative embodiments, the upper and lower seal rings may comprise, for example, non-metallic materials such as polytetrafluoroethylene (PTFE), nylon, graphite, and the like. Other suitably selected seal materials may also be used, including either non-metallic or metallic seals.

In some embodiments, the valve assembly 10 may comprise a means for fixedly attaching the valve bonnet 32 to the upper end 33U of the valve body 33 during operation of the valve assembly 10, so as to contain and seal against the valve element 36. In certain embodiments, the means for fixedly attaching the valve bonnet 32 to the valve body 33 may comprise, for example, a plurality of fasteners 34, as shown in FIG. 3. During maintenance periods, on the other hand, valve bonnet 32 may be removed, such as by removing the fasteners 34, so as to provide access to and even removal of the valve element 36 and/or the upper and lower seal rings 37, 38 for inspection and/or repair. As previously discussed with respect to fasteners 23, 26 and 30, in some illustrative embodiments, the fasteners 34 may also be threaded fasteners of a type, size, and material composition as may be appropriate based on the parameters discussed above, such as design conditions, access and space availability to the fasteners 34, and the like. In the illustrative embodiment shown in FIG. 3, the fasteners 34 may be socket head cap screws, wherein a tapped hole configuration is used in the at the upper end 33U of the valve body 33, and wherein the socket head is also counter-sunk into the valve bonnet 32 so as to facilitate a close fit between the valve bonnet 32 and the second split body clamp 22.

As shown in FIG. 3, the valve bonnet 32 may comprise a downwardly extending sealing element 32v, which, during assembly of the valve 1, is adapted to be inserted into and to protrude inside of the upper end 33U of the valve body 33. Hence, in some illustrative embodiments of the present disclosure, a seal ring 35 may be disposed in a seal ring groove 35g formed in the outside surface 32a of the sealing element 32v in order to obtain a pressure-tight radial seal between the valve bonnet 32 and the valve body 33. It should be noted, however, that, unlike the seal ring 31 that may be used as a sealing means for obtaining a face seal between the valve 1 and the upper split body assembly 3, in one illustrative embodiment, the seal ring 35 may not be compressed against the inside surface 33i of the valve body and the bottom and/or side surfaces of the seal ring groove 35g by the means used for fixedly attaching the valve bonnet 32 to the valve body 33, e.g., by tightening the fasteners 34. Instead, in order to affect a pressure-tight radial seal between the valve bonnet 32 and the valve body 33, compression of the illustrative seal ring 35 depicted in the illustrative embodiment shown in FIG. 3 may occur when the downwardly extending sealing element 32v of the valve bonnet 32 is inserted into the upper end 33U of the valve body 33. Accordingly, in some illustrative embodiments, the clearance between the outside surface 32a of the downwardly extending sealing element 32v and the inside surface 33i of the valve body 33 may be set as necessary to ensure that the seal ring 35 is properly compressed so as to create the requisite radial seal. As noted above regarding seal rings 24, 25, 27 and 31, the seal ring 35 may, in certain embodiments, be an O-ring seal, the material composition of which may be selected as discussed previously.

As noted previously, in some embodiments of the valve assembly 10 disclosed herein, the valve 1 may comprise a valve stem 39, which, as shown in FIG. 3, may extend through a valve stem housing portion 39s of the valve body 33. Additionally, the valve stem 39 may be adapted to engage a valve actuator 6, which may be fixedly attached to the valve stem housing portion 39 of the valve body 33 by a plurality of threaded fasteners 41, the size, type, and material composition of which may be selected as previously discussed with respect to fasteners 23, 26, 30 and 34 above. Furthermore, the valve 1 may also comprise various valve stem sealing elements 40 as are well known in the valve arts, including but not limited to valve stem sealing elements such as bushings, bearings, seals, packing, backing rings, and the like, and which accordingly will not be described further herein.

FIG. 3 further shows that the valve assembly 10 may further a lower split body assembly 4 that may be, in some illustrative embodiments of the present invention, substantially similar to the upper split body assembly 3, as previously discussed above. For example, the lower split body assembly 4 may, in certain embodiments, comprise a first split body clamp 43 and a second split body clamp 44 and a means for clamping the first and second split body clamps 43, 44 around the lower piping component 8 (not shown in FIG. 3; see, FIG. 1). Furthermore, in some illustrative embodiments, the clamping means used for clamping the first and second split body clamps 43, 44 of the lower split body assembly 4 around the lower piping component 8 may be substantially similar as that utilized for clamping the upper split body assembly 3 around the upper piping component 7. For example, the clamping means may comprise a plurality of fasteners 46, the size, type and material composition of which may be substantially as discussed with respect to fasteners 23 above. Furthermore, and as with the upper split body assembly 3 described above, the first and second split body clamps 43, 44 of the lower split body assembly 4 may each comprise lips or flanged portions 43f, 44f, respectively, so as to facilitate the clamping action induced by the fasteners 45. The material composition of the first and second split body clamps 43, 44 of the lower split body assembly 4 may also be selected as described above with respect to first and second split body clamps 21, 22 of the upper split body assembly 3.

As previously noted in the discussion of the illustrative embodiment depicted in FIG. 1 above, fluid communication may be facilitated between the lower piping component 8 and the valve 1 by providing an opening (not shown) located in the lower piping component 8 proximate the interface of the lower split body assembly 4 and the valve 1. Additionally, in some embodiment, a sealing means may be used in order to obtain a pressure-tight seal between the second split body clamp 44 and the lower piping component 8 (not shown) that may be substantially similar to that used for affecting a seal between the upper split body assembly 3 and the upper piping component 7, such as, for example, a seal ring 46 disposed in a seal ring groove 46g surrounding the opening in the lower piping component 8. Furthermore, in some illustrative embodiments the seal ring 46 may be an O-ring seal, materials for which may also be selected as detailed for seal ring 24 above.

In some illustrative embodiments, the valve assembly 10 may further comprise a means for fixedly attaching to the lower split body assembly 4 to valve 1 that may be substantially similar to that used to fixedly attach the upper split body assembly 3 to the valve 1, as previously described. For example, as shown in FIG. 3 the lower split body assembly may be fixedly attached to the valve 1 by a plurality of fasteners 42, the size, type and material composition of which may be substantially similar to the fasteners 30 used for fixedly securing the upper split body assembly 3 to valve 1, as described above. However, in certain illustrative embodiments of the present disclosure, the fit-up of the valve 1 to the lower split body assembly 4, and affecting a pressure-tight seal between the valve 1 and the upper sealing surface 4U of the second split body clamp 44, may be accomplished in a substantially different manner than that employed between the upper split body assembly 3 and the valve 1, as discussed above. More specifically, fit-up and sealing between the valve 1 and the lower split body assembly 4 may be facilitated by the length-adjustable spacer ring assembly 2 illustrated in FIGS. 4a-4c, as will now be discussed in detail.

FIG. 4a shows an illustrative embodiment of the length-adjustable spacer ring assembly 2 after the valve 1 has been fixedly attached to the lower split body assembly 4 as previously described. In some illustrative embodiments, the length-adjustable spacer ring assembly 2 may comprise a spacer ring 50 and a means for adjusting the position of the spacer ring 50 relative to the lower end 33L of the valve body 33. As shown in FIG. 4a, the means for adjusting the position of the spacer ring 50 relative to the lower end 33L of the valve body 33 may comprise, in certain embodiments of the disclosed subject matter, a threaded interface 51, wherein an internally threaded surface 50i of the spacer ring 50 is adapted to threadably engage a correspondingly externally threaded surface 33e on an outside circumference of a flanged portion 33f of the valve body 33 at the lower end 33L thereof. In the assembled condition of the illustrative valve assembly 10 shown in FIG. 4a, the lower face 50L of the spacer ring 50 may be in bearing and/or sliding contact with a surface 44s of the second split body clamp 44 at an interface 52 near the outside circumference 44c of the split body clamp 44. Accordingly, the load path of the means used for fixedly attaching the lower split body assembly 4 to the valve 1—e.g., the plurality of fasteners 42—may be transmitted therebetween via the threaded interface 51 and the contact interface 52, thereby bypassing the movable sealing element 53 and associated sealing surfaces, as will be discussed in further detail below.

As with the other components of the valve assembly 10, the spacer ring 50 may be fabricated from one of several well known wrought product forms commonly used for valve assembly parts of this type, such as, for example bar, plate, forgings, and the like. Furthermore, in certain illustrative embodiments, the material composition of the spacer ring 50 may be any one of several well known and suitable materials, such as carbon steel or stainless steel and the like, provided however that adequate consideration be given to the surface galling tendencies of materials having relatively high nickel content, which may be of concern regarding the threaded interface 51 and the bearing/sliding interface 52 discussed above.

In some embodiments, the length-adjustable spacer ring assembly 2 may also comprise a movable sealing element 53 positioned inside of a valve body groove 33g formed in the lower end 33L of the valve body 33. In one illustrative embodiment, the movable sealing element 53 may comprise a first sealing means adapted to provide a first pressure-tight seal against an inside sealing surface 33a of the valve body groove 33g, and a second sealing means adapted to provide a second pressure-tight seal against the upper sealing surface 4U of the second split body clamp 44. As shown in FIG. 4a, the first sealing means may comprise, for example, a radial seal, wherein a seal ring 54 may be disposed in a seal ring groove 54g formed in the inside surface sealing 53i of the movable sealing element 53. It should be noted that, as discussed above with respect to the seal ring 35 adapted to provide a pressure-tight radial seal between the valve bonnet 32 and the valve body 33, the requisite compression of the seal ring 54 needed to affect a radial between the inside sealing surface 33a of the valve body groove 33g and an inside surface of the seal ring groove 54g may be provided when the movable sealing element 53 is inserted into the valve body groove 33g. Accordingly, in certain illustrative embodiments the clearance between the inside sealing surface 33a of the valve body groove 33g and the inside sealing surface 53i of the movable sealing element 53 may be set as necessary to ensure that the seal ring 54 creates the requisite radial seal. Moreover, in at least some embodiments, the valve body groove 33g may be positioned in the lower end 33L of the valve body 33 such that a fluid space created between the movable sealing element 53 and the bore of the valve element 36 may be minimized, thereby substantially reducing the amount of fluid that may be present in the valve 1 during valve maintenance and/or removal activities.

As mentioned previously, it should be noted that since the load path of the means used for fixedly attaching the valve 1 to the lower split body assembly 4 (e.g., the plurality of fasteners 42) passes through the threaded interface 51 and the contact interface 52—i.e., it bypasses the movable sealing element 53—prior to affecting a pressure-tight seal against the lower split body assembly 4, the movable sealing element 53 may be moved freely and as required within the valve body groove 33g relative to the lower end 33L of the valve body 33 and the upper sealing surface 4U. Accordingly, in some illustrative embodiments, the second sealing means noted above may comprise, for example, a face seal, wherein a seal ring 55 may be disposed in a seal ring groove 55g formed in the lower sealing surface 53L of the movable sealing element 53. Furthermore, and so as to ensure that sufficient compression of the seal ring 55 against the upper sealing surface 4U of the second split body clamp 44 and an inside surface of the seal ring groove 55 occurs so as to affect a pressure-tight face seal during initial assembly—and to ensure that the face seal is maintained during normal operation—in some embodiments the second sealing means may further comprise means for moving the movable sealing element 53 so as to bring the lower sealing surface 53L of the movable sealing element 53 into sealing contact with the upper sealing surface 4U of the second split body clamp 44, thereby containing the seal ring 55 in the seal ring groove 55g. In one illustrative embodiment, compression of the seal ring 55 may be accomplished by a plurality of set screws 56, which may engage with threaded openings 33t in the valve body 33. In certain illustrative embodiments, the plurality of set screws 56 engaging the threaded openings 33t may be tightened against the upper end of the movable sealing element 53 so as to move the movable sealing element 53 down and into contact with the upper sealing surface 4U of the second split body clamp 44. As shown in FIG. 4a, when the set screws 56 are tightened, the lower end 56L of the set screws 56 may come into contact with a chamfered surface 53c at the upper end of the movable sealing element 53, thereby moving the movable sealing element 53 downward as the set screw 56 tightening continues, and into contact with the upper sealing surface 4U as noted above.

In at least some of the embodiments disclosed herein, the headed portion of each set screw 56 may not come into contact with, or "bottom out" against, any portion of the valve body 33 during the set screw tightening process, such that a gap 56g may remain between the head of each set screw 56 and the valve body 33. The presence of a gap 56g between the set screw 56 and the valve body 33 may allow for a greater degree of flexibility regarding the distance that the movable sealing element 53 may be pushed downward, i.e., toward the upper sealing face 4U of the second split body clamp 44, thus providing additional assurance that the seal ring 55 may be adequately compressed, and that a pressure-tight seal may be obtained. In certain illustrative embodiments, a counter-sunk hole 33c may be provided in the valve body 33, which may thereby provide the appropriately relief space so that the gap 56g may be maintained between the head of each set screw 56 and the valve body 33.

In some illustrative embodiments, the plurality of set screws 56 may also be preloaded in such a manner as to resist the axial pressure load that may act to push the movable sealing element 53 away from the upper sealing surface 4U of the second split body clamp 44 during operation of the valve assembly 10. In certain embodiments, depending on the nominal size of the valve 1 and the force required to maintain proper compression of the seal ring 55, the set screws 56 may be larger threaded fasteners as required for the anticipated loading conditions. Moreover, the number of set screws 56 and the magnitude of a set screw preload may vary depending upon the particular application. For example, in some illustrative embodiments disclosed herein, the plurality of set screws 56 may be a quantity of four (4) M10 socket head cap screws, and the like, which, in certain embodiments, may be tightened to a torque value in the range of 65-75 N-m.

The movable sealing element 53 may be fabricated from one of several well known wrought product forms, such as bar, plate, forgings, and the like. Furthermore, in some illustrative embodiments, the material composition of the spacer ring 50 may be substantially the same as that used for the any of the previously discussed component of the valve assembly 10 that may be exposed to the process environment, such as the valve body 33 and/or the upper and lower split body assemblies 3, 4, and the like. For example, in certain illustrative embodiments the material composition of the movable sealing element 53 may be carbon steel, stainless steel, or even high alloy steel and the like, as may be appropriate based on the specific system design parameters. Other materials may also be used. Additionally, and as discussed previously with respect to seal rings 24, 25, 27, 31 and 35, in one or more embodiments of the present disclosure the seal rings 54 and 55 may be, for example, flexible elastomeric O-ring seals. The material composition the seal rings 54 and 55 may also comprise any one of the several well known thermoset synthetic rubbers mentioned previously, such as nitrile rubber, butyl rubber, silicone rubber, neoprene, fluoroelastomers, and the like. Other suitably selected materials may also be used.

As mentioned previously, the length-adjustable spacer ring assembly 2 may be used in conjunction with the valve assembly 10 disclosed herein so as to adjust the overall length of the valve 1 during initial installation, and/or when removing the valve 1 from service. FIG. 4b shows the length-adjustable spacer ring assembly 2 during one phase of the installation of the valve 1 between the upper sealing surface 3L of the upper split body assembly 3 and the upper sealing surface 4U of the lower split body assembly 4. As shown in FIG. 4b, the spacer ring 50 is threadably engaged with the flanged portion 33f of the valve body 33, however, in comparison to the fully assembled length-adjustable spacer ring assembly 2 shown in FIG. 4a, the spacer ring 50 has been rotated on the threaded interface 51 and moved axially upward relative to the lower end 33L of the valve body 33. The spacer ring 50 may be rotated on the threaded interface 51 in any one of several ways known to those skilled in the art. For example, in one illustrative embodiment disclosed herein, the spacer ring 50 may rotated by inserting one or more round rods (not shown)—of sufficient length to be gripped either manually, by a tool, or by a machine—into one or more holes 50h drilled in the outer circumference 50c of the spacer ring. The size 50s and depth 50d of the holes 50h may be adapted as required to fit the rods (not shown) in such a manner as to hold the rods in place and in a substantially stable manner, thereby enable a rotational force to be transferred from the rods to the spacer ring 50 via the holes 50h. Thereafter, the spacer ring 50 may be rotated by gripping one or more rods (not shown) and applying a rotational force to move the spacer ring 50 along the threaded interface 51.

In the position shown in FIG. 4b, the spacer ring 50 may be considered to be "retracted" relative to the surface 44s near the outside circumference 44c of the second split body clamp 44, thus providing a gap 57 between the lower face 50L of the spacer ring 50 and the upper sealing surface 4U of the second split body clamp 44. Moreover, it should be noted that the spacer ring 50 may be further rotated on the threads 51 so as to be moved axially upward and/or downward relative to the lower end 33L of the valve body 33, thereby adjusting the overall length of the valve 1 prior to it being positioned between the lower and upper sealing surfaces 3L and 4U of the upper and lower split body assemblies 3, 4, respectively, and further ensuring that adequate clearance is present when the valve 1 is positioned between the upper and lower split body assemblies 3, 4 during initial installation.

In certain illustrative embodiments, the gap 57 may range from 1-6 mm, depending on whether the spacer ring 50 may be partially retracted or fully retracted. In other illustrative embodiments, and depending on the as-built spacing between the upper sealing surface 3L of the upper split body assembly 3 and the upper sealing surface 4U of the lower split body assembly 4 prior to valve installation, full spacer ring retraction may range on the order of 10-20 mm, or even greater.

As previously discussed with respect to the clearance between the spacer ring 50 and the upper sealing surface 4U of the second split body clamp 44, it may also be necessary to provide similarly adequate clearance between the lower sealing surface 53L of the movable sealing element and the upper sealing surface 4U prior to installing the valve 1. Accordingly, the movable sealing element 53 may also be "retracted" as necessary relative to the lower face 33L of the valve body 33 by inserting the movable sealing element 53 into the valve body groove 33g as required for the appropriate clearance. FIG. 4b shows one illustrative embodiment wherein the movable sealing element 53 may be inserted into the valve body groove 33g so as to provide a gap 58 between the lower sealing surface 53L of the movable sealing element 53 and the upper sealing surface 4U of the second split body clamp 44. Furthermore, as also shown in FIG. 4b, the movable sealing element 53 may be fully inserted into the valve body groove 33g such that the upper surface 53U of the movable sealing element 53 is in contact with the upper inside surface 33b of the valve body groove 33g.

In some illustrative embodiments, the gap 58 may be substantially the same as the gap 57 between the spacer ring 50 and the surface 44s of the second split body clamp 44, whereas in other embodiments the gap 58 may be greater than or less than the gap 57. However, it should be noted that while the movable sealing element 53 need not be fully inserted into the valve body groove 33g (as shown in the illustrative embodiment depicted in FIG. 4b), inserting the movable sealing element 53 any amount less than full insertion will result in the gap 58 being commensurately reduced. Furthermore, it should also be noted that the total amount of clearance available between the valve 1 and the upper sealing surface 4U during valve installation may also be commensurately reduced, as the total amount of clearance will be determined by whichever of the two gaps 57, 58 may be less.

As shown in the installation phase of the valve 1 depicted in FIG. 4b, when initially installed between the upper and lower split body assemblies 3, 4, the valve 1 may thereafter be fixedly attached to the upper split body assembly 3 by the plurality of fasteners 30 as described above and illustrated in FIG. 3. In certain illustrative embodiments, fixedly attaching the valve 1 to the upper split body assembly 3 may facilitate maintaining the gaps 57, 58 between the length-adjustable split ring assembly 2 and the lower split body assembly 4 during the subsequent installation phases of valve 1, as will now be described in conjunction with FIGS. 4c-4d below.

FIG. 4c shows the illustrative length-adjustable spacer ring assembly 2 of FIG. 4b in a further installation phase of the valve 1. As shown in FIG. 4c, the spacer ring 50 has been moved axially downward relative to the lower end 33L of the valve body 33 by rotating the spacer ring 50 on the threaded interface 51 until the lower face 50L of the spacer ring 50 contacts the surface 44s of the second split body clamp 44 at the interface 52. After the spacer ring 50 has been adjusted to contact the second split body clamp 44, the valve 1 may fixedly attached to the second split body clamp 44 of the lower split body assembly 4 by the means previously discussed (e.g., by the using fasteners 42), thereby fixing the adjusted as-installed overall length of the valve 1.

FIG. 4d depicts the illustrative length-adjustable spacer ring assembly 2 of FIG. 4c in a yet further installation phase of the valve 1. As shown in the illustrative embodiment of FIG. 4d, the set screws 56 may be installed and tightened as previously described so as to move the movable sealing element 53 inside the valve body groove 33g and relative to the lower end 33L of the valve body 33 so that the lower sealing surface 53L of the movable sealing element 53 may be moved closer to the upper sealing surface 4U of the second split body clamp 44. Since, as shown in FIG. 4a and discussed above, the load path induced by the fasteners 42 when fixedly attaching the valve 1 to the lower split body assembly 4 may bypass the movable sealing element 53, the movable sealing element 53 may, in certain embodiments, be able to maintain a radial seal against the inside sealing surface 33a of the valve body groove 33g while being moved downward—i.e., toward the upper sealing surface 4U. FIG. 4d shows the illustrative movable sealing element 53 after the set screws 56 have been partially tightened, and some amount of movement of the moving sealing element has occurred such that the distance between the lower sealing surface 53L and upper sealing surface 4U has been reduced to a gap 58a. Thereafter, the set screws 56 may be further tightened and the seal ring 55 compressed against the surfaces of the groove 55g and the upper sealing surface 4U, thus providing pressure-tight seals between the valve 1 and the lower split body assembly 4, as shown in FIG. 4a and discussed above.

It should be noted that, in some illustrative embodiments of the present disclosure, one or more of the set screws 56 may remain engaged with the threaded openings 33t in the valve body 33 throughout some or all of the steps described above and illustrated in FIGS. 4a-4d. However, during those phases of valve installation wherein the movable sealing element 53 may be retracted within the valve body groove 33g, the set screws 56 may be loosened such that only a few threads of each set screw 56, such as 1-3 threads, remain engaged with the threaded openings 33t of the valve body 33. In other embodiments, one or more the set screws 56 may be completely removed, as is illustrated in FIGS. 4b-4c.

Loosening of the length-adjustable spacer ring assembly 2 illustrated in FIGS. 4a-4b so as to facilitate the removal of the valve 1 from between the upper and lower split body assemblies 3, 4 may be accomplished substantially as described below. In certain illustrative embodiments, the plurality of set screws 56 may either be removed—or loosened so as to be engaged by only a few threads as described above—thereby removing the load used to maintain the compression of the seal ring 55 against the upper sealing surface 4U. Next, round rods, such as those use to initially adjust the length of length-adjustable spacer ring assembly and described above, may be installed into the openings 50h, so as to facilitate the loosening and subsequent "retraction" of the spacer ring 50. By rotating the spacer ring 50 on the threaded interface 51, the spacer ring 50 may then be moved axially upward—i.e., away from second split body clamp 44. Rotation of the spacer ring 50 may thereafter continue until a gap 57 (see, FIG. 4b) large enough to facilitate removal of the valve 1, such as a gap ranging from 1-6 mm, may be present between the lower face 50L of the spacer ring 50 and the surface 44s of the second split body clamp 44.

In some illustrative embodiments, the plurality of fasteners 42 fixedly attaching the valve 33 to the lower split body assembly 4 (see, FIGS. 4a, 4c) may thereafter be loosened and removed. In some embodiments of the valve removal process disclosed herein, the plurality of fasteners 30 fixedly attaching the valve 1 to the upper split body assembly 3 (see, FIG. 3) may also be loosened and removed, so that the valve 1 is no longer secured to either the upper split body assembly 3 or to the lower split body assembly 4. Thereafter, a force may be applied to the round rods previously inserted into the holes 50h of the spacer ring 50—such as by grasping the round rods and pushing the valve 1 downward, and the like—so that the entire valve 1 may be moved axially toward the second split body clamp 44, thereby "retracting" the movable sealing element 53 back up and into the valve body groove 33g. In some embodiments, the valve 1 may thereafter be lifted away from the lower split body assembly 4 so that a gap 58 (see, FIG. 4b) large enough to facilitate removal of the valve 1, such as a gap ranging from 1-6 mm as previously discussed, may be created between the lower end 53L of the movable sealing element 53 and the upper sealing surface 4U. Once gaps 57, 58 of sufficient size have been created in the manner described above, the valve 1 may then be removed from between the upper and lower split body assemblies 3, 4.

FIGS. 5a-5c, showing the installation of a length-adjustable valve according to some embodiments of present disclosure, will now be described.

FIG. 5a shows an illustrative embodiment of the valve assembly 10 depicted in FIG. 1 prior to installation of the valve 1 between the upper split body assembly 3 and the lower split body assembly 4. In some illustrative embodiments, the valve assembly 10 may be one of a plurality of representative valve assemblies 10 of a piping system or piping manifold, such as the piping manifold 100 of FIGS. 2a-2c. Similarly, in some embodiments the upper and lower piping components 7, 8 may also be two of a plurality of representative piping components of a piping system or piping manifold 100. As shown in FIG. 5a, the respective centerlines 7c, 8c of the upper and lower piping components 7, 8 may be separated by a distance 11, which in certain illustrative embodiments may be representative of a typical spacing between centerlines of similarly disposed piping components of a piping system or piping manifold 100. Additionally, the upper sealing surface 3L of the upper split body assembly 3 may be at a distance 3h below the centerline 7c of the upper piping component 7, and the upper sealing surface 4U of the lower split body assembly 4 may be at a distance 4h above the centerline 8c of the lower piping component 8. Also as shown in FIG. 5a, the lower and upper sealing surfaces 3L, 4U of the upper and lower split body assemblies 3, 4, respectively, are separated by a distance 9, which, in certain illustrative embodiments may also be indicative of a typical spacing between the sealing surfaces of a plurality of representative branch connections of a piping system or piping manifold 100. Furthermore, in some embodiments, the overall combined length 9a of the valve 1 and length-adjustable spacer ring assembly 2 may be adjusted prior installation of the valve 1 using the length-adjustable spacer ring assembly 2 as previously described with respect to FIG. 4b above, such that the length 9a is less than the distance 9 between the lower and upper sealing surfaces 3L, 4U. Moreover, prior to installation, the movable sealing element 53 (not shown) may also be "retracted" into the valve body groove 33g (not shown) of the valve 1, as previously described with respect to FIG. 4b above.

Also as shown in FIG. 5a, in certain embodiments of the present disclosure, the valve actuator 6 (not shown; see, FIG. 1) may not be attached to the valve 1 prior to the installation of the valve 1 between the respective mating connections, such as, for example, the upper and lower split body assemblies 3, 4. Depending on the overall procedures employed during valve installation, the valve actuator 6 may be attached to the valve 1 after completion of the valve installation steps illustrated in FIGS. 5a-5c and discussed herein. However, it should be appreciated that the valve actuator 6 may also be attached to the valve 1 prior to installing the valve 1, as may be required by the specific valve installation procedure.

It should be appreciated that in some illustrative embodiments of the present disclosure, wherein the configuration of the upper split body assembly 3 may be substantially the same as the configuration of the lower split body assembly 4, the distances 3h and 4h may be substantially similar. However, in other illustrative embodiments, such as, for example, wherein the branch assembly used to enable fluid communication from the upper piping component 7 to the valve 1 may be substantially different from the assembly used to enable fluid communication from the lower piping component 8 to the valve 1, the distances 3h and 4h may be substantially different.

For example, in certain illustrative embodiments of the present disclosure, a branch assembly other than the upper split body assembly 3 may be used to enable fluid communication from the upper piping component 7 to the valve 1, such as a standard welded and/or flanged branch connection accordingly to ANSI B16 and the like, whereas a lower split body assembly 4 may still be used to enable fluid communication between the lower piping component 8 and the valve 1. In such embodiments, the distance 3h may therefore be in accordance with, for example, ANSI B16 standards, whereas the distance 4h may be as previously described for the lower split body assembly 4. Furthermore, in other illustrative embodiments, an upper split body assembly 3 may still be used to enable fluid communication between the upper piping component 7 and the valve 1, whereas a the lower branch connection may be in accordance with, for example, ANSI B16 standards. In still further embodiments, one or both of the upper and lower branch connections may be configured to ANSI B16 standards, or one or both may be based on a non-standard specially-designed configuration. It should be understood that in such embodiments, the fastener sizes, types, and patterns used for fixedly attaching the valve 1 to upper and lower branch connections which may be configured to ANSI B16 standards and/or other non-standard designs may be adjusted as necessary to ensure that pressure-tight seals are obtained between the valve 1 each of the upper and lower branch connections. Generally, therefore, the subject matter disclosed herein should not be construed to limit the branch connections used to enable fluid communication from the upper and lower piping components 7, 8 to the valve 1 to the upper and lower split body assemblies 3, 4, as other configurations are within the spirit and scope of the present disclosure.

FIG. 5b depicts the illustrative valve assembly 10 of FIG. 5a in a further installation phase of the valve 1. As shown in FIG. 5b, the valve 1, which in the illustrated embodiment, has an adjusted overall length 9a that is less than the distance 9 between the lower and upper sealing surfaces 3L, 4U, may be positioned between the upper and lower split body assemblies 3, 4. Thereafter, the valve 1 may be fixedly attached to the upper split body assembly as previously described with respect to FIG. 3 above.

FIG. 5c shows the illustrative valve assembly 10 of FIGS. 5a-5b in yet a further installation phase of the valve 1. As shown in FIG. 5c, the length-adjustable spacer ring assembly 2 and movable sealing element 53 (not shown) may be operated as previously described with respect to FIGS. 4a-4d above as to thereby adjust the overall combined length of the valve 1 and length-adjustable spacer ring assembly 2 to substantially equal the distance 9 between the lower and upper sealing surfaces 3L, 4U of the upper and lower split body assemblies 3, 4, respectively. Thereafter, the valve 1 may be fixedly attached to the lower split body assembly 4 as previously described with respect to FIGS. 4a-4d above, such that the load path may be transferred through the length-adjustable spacer ring assembly 3, bypassing the movable sealing element 53 (not shown) used to affect a pressure-tight seal between the valve 1 and the lower split body assembly 4. Depending on the valve installation sequence employed, the valve actuator 6 may then be attached to the valve 1, as shown in FIG. 5c.

It should be appreciated that, in some illustrative embodiments, removal of the valve 1 may be in a substantially reverse order of the sequence illustrated in FIGS. 5a-5c and described above, wherein the specific details regarding the length-adjustable spacer ring assembly 2 have been previously described. Furthermore, it should also be appreciated that installation and removal of the valve 1 may be independent of the actual orientation of the valve assembly 10, including the valve 1, the length-adjustable spacer ring assembly 2, and the mating components 3, 4 illustrated in FIGS. 5a-5c. For example, the valve assembly 10 may be oriented such that length-adjustable spacer ring assembly 2 may be positioned above the valve 1, and the spacer ring 50 may be moved axially upward—i.e., toward the adjacent sealing face—during the length adjustment steps, instead of axially downward as described herein and illustrated in the figures. However, it should be understood that the overall operation and function of the valve assembly 10 described herein may not be affected. Moreover, the valve assembly 10 may also be oriented at any angle relative to a horizontal and/or vertical plane without substantially affecting function and operation, or the steps described herein for installation and/or removal of the valve 1.

Accordingly, the subject matter disclosed herein therefore teaches various embodiments of a length-adjustable spacer ring assembly adapted to adjust an overall length of a pressure-retaining piping components, such as a valve assembly and the like, and methods of using the same. In certain embodiments, the length-adjustable spacer ring assembly of the present disclosure may be used in conjunction with highly compact, specially designed valve assemblies with closely spaced piping components, whereas in other embodiments the length-adjustable spacer ring assembly disclosed herein may be used to retrofit existing manifolds or piping systems wherein a length-adjustable valve may be required that will precisely fit within the fixed space that may be available between the adjacent sealing surfaces of existing piping components. Furthermore, it should readily be appreciated that the length-adjustable spacer ring assembly disclosed herein may also be used in conjunction with pressure-retaining components other than valves—such as pumps, vessels, tanks, filters, and similar processing equipment and the like—so as to adjust the overall length (or length) of the pressure-retaining component and thereby precisely fit the pressure-retaining component in a fixed space between adjacent sealing surfaces.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A device, comprising:
   a first pressure component having a first end;
   an adjustable spacer ring that is adapted to be operatively coupled to said first pressure component and to adjust a combined overall length of said first pressure component and said adjustable spacer ring;
   a second pressure component having a second end that is adapted to be positioned proximate said first end of said first pressure component, wherein said adjustable spacer ring is further adapted to contact said second end of said second pressure component when said combined overall length is adjusted; and
   a slidably movable sealing element that is adapted to be positioned between said first and second pressure components and to slidably move in a substantially axial direction relative to said first and second pressure components.

2. The device of claim 1, wherein said adjustable spacer ring is adapted to be operatively coupled to said first pressure component at a threaded interface and to rotate on said threaded interface so as to move relative to said first end of said first pressure component.

3. The device of claim 1, wherein a distance said adjustable spacer ring is adapted to move is in the range of 1-6 mm relative to said first and second pressure components.

4. The device of claim 1, wherein said slidably movable sealing element is further adapted to affect a pressure-tight seal between said first and second ends of said respective first and second pressure components.

5. The device of claim 4, wherein a portion of said slidably movable sealing element is adapted to extend beyond said first end of said first pressure component when affecting said pressure-tight seal between said first end and said second end of said second pressure component.

6. The device of claim 5, wherein said second end of said second pressure component is adapted to be spaced an axial distance away from said first end of said first pressure component when said slidably movable sealing element affects said pressure-tight seal between said first end and said second end.

7. The device of claim 1, wherein said slidably movable sealing element is further adapted to affect a pressure-tight seal at a circumferential sealing surface at said first end of said first pressure component and a pressure-tight seal at a radial sealing surface at said second end of said second pressure component.

8. The device of claim 7, wherein said radial sealing surface is adapted to be substantially perpendicular to said circumferential sealing surface when said second end is positioned proximate said first end.

9. The device of claim 8, wherein said pressure-tight seal at said circumferential sealing surface is a radial seal and said pressure-tight seal at said radial surface is a face seal.

10. A device, comprising:
    a first pressure component having a circumferential sealing surface;
    a second pressure component having a radial sealing surface that is adapted to be positioned proximate said circumferential sealing surface, wherein said radial sealing surface is substantially perpendicular to said circumferential sealing surface when positioned proximate thereto;
    a slidably movable sealing component that is adapted to be positioned between and axially moved relative to said first and second pressure components, wherein said slidably movable sealing component is further adapted to affect a pressure-tight radial seal with said circumferential sealing surface of said first pressure component and a pressure-tight face seal with said radial sealing surface of said second pressure component; and
    means for moving said slidably movable sealing component in a substantially axial direction relative to said first and second pressure components so as to affect said pressure-tight face seal.

11. The device of claim 10, wherein said slidably movable sealing component comprises first sealing means for affecting said pressure-tight radial seal with said circumferential sealing surface of said first pressure component and second sealing means for affecting said pressure-tight face seal with said radial sealing surface of said second pressure component.

12. The device of claim 11, wherein said slidably movable sealing component is positioned in and adapted to slidably move within a groove of said first pressure component, said groove comprising said circumferential sealing surface.

13. The device of claim 11, wherein said first sealing means comprises a seal ring positioned between an inside circumferential sealing face of said slidably movable sealing component and said circumferential sealing surface of said first pressure component.

14. The device of claim 11, wherein said second sealing means comprises a seal ring positioned between a lower radial sealing surface of said slidably movable sealing component and said radial sealing surface of said second pressure component.

15. The device of claim 14, wherein said means for axially moving said slidably movable sealing component is adapted to move said lower radial sealing surface of said slidably movable sealing component into sealing contact with said radial sealing surface of said second pressure component.

16. The device of claim 10, wherein said circumferential sealing surface is positioned at a first end of said first pressure component and said radial sealing surface is positioned at a second end of said second pressure component.

17. The device of claim 16, wherein a portion of said slidably movable sealing component is adapted to extend beyond said first end of said first pressure component when affecting said pressure-tight seal with said radial sealing surface of said second pressure component.

18. The device of claim 17, wherein said second end of said second pressure component is adapted to be spaced an axial distance away from said first end of said first pressure component when said slidably movable sealing component affects said pressure-tight seal with said circumferential seal surface of said first pressure component and said pressure-tight seal with said radial sealing surface of said second pressure component.

19. A length-adjustable pressure-retaining device, comprising:
   a first pressure component;
   a spacer ring that is adapted to be operatively coupled to said first pressure component, to adjust an overall combined length of said first pressure component and said spacer ring by moving in a substantially axial direction relative to an end of said first pressure component and a face of a second pressure component positioned adjacent thereto, and to transfer a load used for fixedly attaching said first pressure component to said second pressure component between said first and second pressure components; and
   a slidably movable sealing element that is adapted to be positioned between said first and second pressure components and to slidably move in a substantially axial direction relative to a first sealing surface at said end of said first pressure component and a second sealing surface of said second pressure component and to provide a pressure-tight seal between said first and second pressure components.

20. The length-adjustable pressure-retaining device of claim 19, wherein said spacer ring comprises a bearing surface at one end thereof that is adapted to contact said face of said second pressure component, and means for bringing said bearing surface into contact with said face of said second pressure component.

21. The length-adjustable pressure-retaining device of claim 20, wherein said means for bringing said bearing surface of said spacer ring into contact with said face of said second pressure component comprises an internally threaded surface that is adapted to threadably engage an externally threaded surface of said first pressure component.

22. The length-adjustable pressure-retaining device of claim 19, wherein said slidably movable sealing element comprises first sealing means for affecting a pressure-tight seal with said first pressure component and second sealing means for affecting a pressure-tight seal with said second pressure component.

23. The length-adjustable pressure-retaining device of claim 22, wherein said first sealing means comprises a first seal ring and said second sealing means comprises a second seal ring.

24. The length-adjustable pressure-retaining device of claim 23, wherein said each of said first and second seal rings comprise an O-ring seal.

25. The length-adjustable pressure-retaining device of claim 23, wherein said slidably movable sealing element is positioned in a groove located in said end of said first pressure component.

26. The length-adjustable pressure-retaining device of claim 25, said first sealing means further comprising wherein said first seal ring is positioned against an inside surface of said groove.

27. The length-adjustable pressure-retaining device of claim 25, wherein said second sealing means further comprises means for moving said slidably movable sealing element in said groove and compressing said second seal ring against said sealing surface of said second pressure component.

28. The length-adjustable pressure-retaining device of claim 27, wherein said means for moving said slidably movable sealing element relative to said sealing surface of said second pressure-retaining component comprises a plurality of fasteners.

29. The length-adjustable pressure-retaining device of claim 19, wherein a first portion of said slidably movable sealing element is adapted to extend beyond said end of said first pressure component when affecting said pressure-tight seal between said first and second pressure components.

30. The length-adjustable pressure-retaining device of claim 29, wherein a second portion of said slidably movable sealing element is adapted to be positioned in a groove at said end of said first pressure component when affecting said pressure-tight seal between said first and second pressure components.

31. The length-adjustable pressure-retaining device of claim 19, wherein said second sealing surface of said second pressure component is adapted to be spaced an axial distance away from said end of said first pressure component when said slidably movable sealing element affects said pressure-tight seal between said first and second pressure components.

32. The device of claim 19, wherein said first sealing surface at said first end of said first pressure component is adapted to be substantially perpendicular to said second sealing surface of said second pressure component when said slidably movable sealing element is slidably moved to provide said pressure-tight seal between said first and second pressure components.

33. A length-adjustable pressure assembly, comprising:
- a first pressure-retaining component having a first length and comprising first and second ends, wherein said first end is adapted to sealingly engage a first sealing surface of a first mating pressure part;
- a second pressure-retaining component that is adapted to sealingly engage a circumferential sealing surface at said second end of said first pressure-retaining component and to be slidably moved in an axial direction relative to said first pressure-retaining component so as to sealingly engage a second sealing surface of a second mating pressure part, wherein said second sealing surface is substantially perpendicular to said circumferential sealing surface when said second pressure-retaining component sealingly engages said circumferential and second sealing surfaces, and wherein a distance between said first sealing surface and said second sealing surface is a fixed distance that is greater than said first length; and
- a spacer ring that is adapted to adjust an overall combined length of said first pressure-retaining component and said spacer ring between at least a first overall combined length that is less than said distance between said first and second sealing surfaces and a second overall combined length that is substantially the same as said distance between said first and second sealing surfaces.

34. The length-adjustable pressure assembly of claim 33, wherein said spacer ring is adapted to threadably engage said first pressure-retaining component.

35. The length-adjustable pressure assembly of claim 33, wherein said spacer ring is adapted to contact a substantially radially oriented contact surface of said second mating pressure part.

36. The length-adjustable pressure assembly of claim 33, wherein said first pressure-retaining component comprises a groove located in said second end thereof and said second pressure-retaining component is adapted to be positioned in said groove.

37. The length-adjustable pressure assembly of claim 36, wherein said second pressure-retaining component is adapted to move in said groove relative to said second end of said first pressure-retaining component and to said second sealing surface of said second mating pressure part.

38. The length-adjustable pressure assembly of claim 33, wherein said second sealing surface of said second mating pressure part is adapted to be spaced an axial distance away from said second end of said first pressure-retaining component when said second pressure-retaining component is slidably moved so as to sealingly engage said second sealing surface.

39. The length-adjustable pressure assembly of claim 33, wherein said second sealing surface of said second mating pressure part is adapted to be substantially perpendicular to said circumferential sealing surface at said second end of said first pressure-retaining component when said second pressure-retaining component sealingly engages said second and circumferential sealing surfaces.

40. The length-adjustable pressure assembly of claim 33, wherein a first portion of said second pressure-retaining component is adapted to project from a groove located at said second end of said first pressure-retaining component and extend beyond said second end when said second pressure-retaining component sealingly engages said second sealing surface of said second mating pressure part.

41. The length-adjustable pressure assembly of claim 40, wherein a second portion of said second pressure-retaining component is adapted to remain in said groove when said second pressure-retaining component sealingly engages said second and circumferential sealing surfaces.

42. A length-adjustable pressure-retaining device, comprising:
- a first pressure component;
- a spacer ring that is adapted to be operatively coupled to said first pressure component, to adjust an overall combined length of said first pressure component and said spacer ring by moving relative to an end of said first pressure component and a face of a second pressure component positioned adjacent thereto, and to transfer a load used for fixedly attaching said first pressure component to said second pressure component between said first and second pressure components; and
- a movable sealing element that is adapted to move relative to said end of said first pressure component and a sealing surface of said second pressure component and to provide a pressure-tight seal between said first and second pressure components, wherein said movable sealing element comprises first sealing means for affecting a pressure-tight seal with said first pressure component and second sealing means for affecting a pressure-tight seal with said second pressure component, said first and second sealing means comprising first and second seal rings, respectively.

43. The length-adjustable pressure-retaining device of claim 42, wherein said spacer ring comprises a bearing surface at one end thereof that is adapted to contact said face of said second pressure component and means for bringing said bearing surface into contact with said face of said second pressure component.

44. The length-adjustable pressure-retaining device of claim 43, wherein said means for bringing said bearing surface of said spacer ring into contact with said face of said second pressure component comprises an internally threaded surface that is adapted to threadably engage an externally threaded surface of said first pressure component.

45. The length-adjustable pressure-retaining device of claim 42, wherein said each of said first and second seal rings comprise an O-ring seal.

46. The length-adjustable pressure-retaining device of claim 42, wherein said movable sealing element is positioned in a groove located in said end of said first pressure component.

47. The length-adjustable pressure-retaining device of claim 46, wherein said first sealing means further comprises said first seal ring being positioned against an inside surface of said groove.

48. The length-adjustable pressure-retaining device of claim 46, wherein said second sealing means further comprises means for moving said movable sealing element in said groove and compressing said second seal ring against said sealing surface of said second pressure component.

49. The length-adjustable pressure-retaining device of claim 48, wherein said means for moving said movable sealing element relative to said sealing surface of said second pressure-retaining component comprises a plurality of fasteners.

50. The length-adjustable pressure-retaining device of claim 42, wherein said first seal ring is adapted to affect a radial seal on a sealing surface of said first pressure component and a face seal on said sealing surface of said second pressure component, said sealing surface of said first pressure component being substantially perpendicular to said sealing surface of said second pressure component.

51. A length-adjustable pressure assembly, comprising:
- a first pressure-retaining component having a first length, said first pressure-retaining component comprising:
  - a first end that is adapted to sealingly engage a first sealing surface of a first mating pressure part; and
  - a second end comprising a groove;
- a second pressure-retaining component that is adapted to be positioned in said groove, said second pressure-retaining component being further adapted to sealingly engage said second end of said first pressure-retaining component and to sealingly engage a second sealing surface of a second mating pressure part, wherein a distance between said first sealing surface and said second sealing surface is greater than said first length; and
- a spacer ring that is adapted to adjust an overall combined length of said first pressure-retaining component and said spacer ring between at least a first overall combined length that is less than said distance between said first and second sealing surfaces and a second overall combined length that is substantially the same as said distance between said first and second sealing surfaces.

52. The length-adjustable pressure assembly of claim 51, wherein said spacer ring is adapted to threadably engage said first pressure-retaining component.

53. The length-adjustable pressure assembly of claim 51, wherein said spacer ring is adapted to contact a contact surface of said second mating pressure part.

54. The length-adjustable pressure assembly of claim 51, wherein said second pressure-retaining component is adapted to move in said groove relative to said second end of said first pressure-retaining component and to said second sealing surface of said second mating pressure part.

\* \* \* \* \*